(12) United States Patent
Kweon et al.

(10) Patent No.: US 6,783,890 B2
(45) Date of Patent: Aug. 31, 2004

(54) POSITIVE ACTIVE MATERIAL FOR RECHARGEABLE LITHIUM BATTERY AND METHOD OF PREPARING SAME

(75) Inventors: Ho-jin Kweon, Cheonan-si (KR); Sung-soo Kim, Cheonan-si (KR); Geun-bae Kim, Cheonan-si (KR); Dong-gon Park, Seoul (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 10/041,921

(22) Filed: Jan. 7, 2002

(65) Prior Publication Data

US 2002/0061444 A1 May 23, 2002

Related U.S. Application Data

(63) Continuation of application No. 09/248,202, filed on Feb. 10, 1999, now Pat. No. 6,372,385.

(30) Foreign Application Priority Data

| Feb. 10, 1998 | (KR) | ............................................ 98-3755 |
| Apr. 6, 1998 | (KR) | ........................................... 98-12005 |
| Oct. 14, 1998 | (KR) | ........................................... 98-42956 |

(51) Int. Cl.[7] .......................... H01M 4/58; H01M 4/32; H01M 4/50
(52) U.S. Cl. .................... 429/218.1; 429/223; 429/224; 429/231.3; 429/231.6
(58) Field of Search ............................. 429/218.1, 223, 429/224, 231.3, 231.6

(56) References Cited

U.S. PATENT DOCUMENTS

| 4,302,518 | A | * | 11/1981 | Goodenough et al. | ...... 429/104 |
| 4,315,976 | A | * | 2/1982 | Conte | .......................... 429/194 |
| 4,610,866 | A | * | 9/1986 | Debsikdar et al. | .......... 423/600 |
| 5,160,712 | A | * | 11/1992 | Thackeray et al. | ......... 423/138 |
| 5,238,760 | A | * | 8/1993 | Takahashi et al. | .......... 429/194 |
| 5,264,201 | A | * | 11/1993 | Dahn et al. | ................. 423/594 |
| 5,350,647 | A | * | 9/1994 | Hope et al. | ................. 429/218 |
| 5,705,291 | A | | 1/1998 | Amatucci et al. | |
| 5,955,051 | A | * | 9/1999 | Li et al. | ..................... 423/594 |

FOREIGN PATENT DOCUMENTS

| EP | 672622 | 9/1995 | |
| EP | 789410 | 8/1997 | |
| JP | 9-55210 | 2/1997 | |
| JP | 9-293508 | 11/1997 | |
| JP | 09-293508 | 11/1997 | |
| WO | WO 97/49136 | * 12/1997 | ............ H01M/4/48 |

* cited by examiner

*Primary Examiner*—Stanley S. Silverman
*Assistant Examiner*—Jonas N. Strickland
(74) *Attorney, Agent, or Firm*—Blakely, Sokoloff, Taylor & Zafman

(57) ABSTRACT

Disclosed is a positive active material for a rechargeable lithium battery. The positive active material includes a core including at least one compound represented by Formula 1 and an active metal oxide shell formed on the core.

Formula 1

$LiA_{1-x-y}B_xC_yO_2$ where $0 \leq x \leq 0.3$, $0 \leq y \leq 0.01$, and

A is an element selected from the group consisting of Co and Mn;

B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

18 Claims, 22 Drawing Sheets

POSITIVE ACTIVE MATERIAL FOR RECHARGEABLE LITHIUM BATTERY AND METHOD OF PREPARING SAME

CROSS REFERENCE TO RELATED APPLICATION

This application is a continuation application of pending prior U.S. patent application Ser. No. 09/248,202, filed on Feb. 10, 1999 Now U.S. Pat. No. 6,372,385, which is incorporated by reference herein in its entirety. In addition, Korean Patent Application Nos. 98-3755, 98-12005, and 98-42956 filed on Feb. 10, Apr. 6, and Oct. 14, 1998, and entitled: "Active material for positive electrode used in the lithium secondary battery and method of manufacturing the same," is incorporated by reference herein in its entirety.

BACKGROUND OF THE INVENTION (a) Field of the Invention

The present invention relates to a positive active material for a rechargeable lithium battery and a method of preparing the same, and more particularly, to a positive active material for a rechargeable lithium battery and a method of preparing the same in which the positive active material exhibits improved structural and thermal stability.

(b) Description of the Related Art

The use of portable electronic instruments is increasing as electronic equipment gets smaller and lighter due to developments in high-tech electronic industries. Studies on rechargeable lithium batteries are actively being pursued in accordance with the increased need for a battery having a high energy density for use as a power source in these portable electronic instruments.

Rechargeable lithium batteries use material into or from which lithium ions are reversibly intercalated or deintercalated as negative and positive active materials. For an electrolyte an organic solvent or polymer is used. Rechargeable lithium batteries produce electrical energy from changes of chemical potentials of the active material during the intercalation and deintercalation reactions of lithium ions.

For the negative active material in a rechargeable lithium battery, metallic lithium was used in the early period of development. However, the lithium negative electrode degrades due to a chemical reaction with the electrolyte. Lithium dissolved in an electrolyte as lithium ions upon discharging is deposited as lithium metal on the negative electrode upon charging. When charge-discharge cycles are repeated, lithium is deposited in the form of dendrites which are more reactive toward the electrolyte due to an enhanced surface area, and they may also induce a short circuit between the negative and positive active materials and even cause an explosion of the battery in the worse case. Such problems have been addressed by replacing lithium metal with carbon-based materials such as an amorphous or crystalline carbon. The carbon-based materials reversibly accept and donate significant amounts of lithium without affecting their mechanical and electrical properties, and the chemical potential of lithiated carbon-based material is almost identical to that of lithium metal.

For the positive active material in the rechargeable lithium battery, a metal chalcogenide compound into or from which lithium ions are intercalated or deintercalated is used. Typical examples include $LiCoO_2$, $LiMn_2O_4$, $LiNiO_2$, $LiNi_{1-x}Co_xO_2$ (0<x<1), or $LiMnO_2$. Mn-based active materials such as $LiMn_2O_4$ or $LiMnO_2$ are the easiest to prepare and they are less expensive and much more environmentally friendly than the other materials, but they have significantly smaller capacities than the other materials. $LiCoO_2$ exhibits good electrical conductivity of $10^{-2}$ to 1 S/cm at ambient temperatures, as well as high cell voltage and good electrochemical properties. Therefore, it is widely used in commercially available rechargeable lithium batteries, although the cobalt-based active material is relatively more expensive than the other materials. $LiNiO_2$ has an advantage of having the highest specific capacity of all, but it is relatively more difficult to synthesize in the desired quality level and is the least stable of all.

These composite metal oxides are manufactured by a solid-phase method. The solid-phase method involves mixing solid raw material powders and sintering the mixture. For example, Japanese Patent publication No. Hei 8-153513 discloses a method in which $Ni(OH)_2$ is mixed with $Co(OH)_2$ or mixed hydroxides of Ni and Co are heat-treated, ground, and then sieved to produce $LiNi_{1-x}Co_xO_2$ (0<x<1). In another method, a reactant mixture of LiOH, Ni oxide and Co oxide is initially heated at 400 to 580° C., and then the heated reactant is heated again at 600 to 780° C. to produce a crystalline active material.

Another way to produce such composite metal oxides is disclosed in Japanese Patent Laid open Hei. 9-55210 (Sony). In this method, a Ni-based material is coated with a metal alkoxide to prepare a positive active material. The metal alkoxide includes Co, Al or Mn. However, the metal coatings in the Ni-based material did not show improvements in the cell performance, e.g. capacity and voltage.

In addition, U.S. Pat. No. 5,705,291 (Bell Communications Research, Inc.) discloses that $LiMn_2O_4$ is mixed with aluminum oxide and briefly heated to obtain an active material with improved behavior. However, this material did not provide with a sufficient improvement in cell performances to satisfy commercial needs.

Therefore, there is sufficient need to develop positive active materials with improved structural and thermal stability, capacity, and cycle life.

SUMMARY OF THE INVENTION

It is an object of the present invention to provide active material for a rechargeable lithium battery with improved structural and thermal stability, capacity and cycle life.

It is another object of the present invention to provide a method of preparing the positive active material for a rechargeable lithium battery.

To achieve the above objects, the present invention provides a positive active material for a rechargeable lithium battery including a core comprising at least one compound represented by Formula 1 and a protective active metal oxide shell formed on the core, the active metal oxide being capable of stabilizing a structure of the active material:

Formula 1

$LiA_{1-x-y}B_xC_yO_2$, where $0 \leq x \leq 0.3$, and $0 \leq y \leq 0.01$;

A is an element selected from the group consisting of Co and Mn;

B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

The positive active material is obtained from a process of preparing crystalline powder or semi-crystalline powder represented by Formula 1, coating the crystalline or semi-crystalline powder with a metal alkoxide suspension, and heat-treating the coated powder.

BRIEF DESCRIPTION OF THE DRAWINGS

Further objects and other advantages of the present invention will become apparent from the following description in conjunction with the attached drawings, in which.

DETAILED DESCRIPTION OF THE INVENTION

Figure 1A:
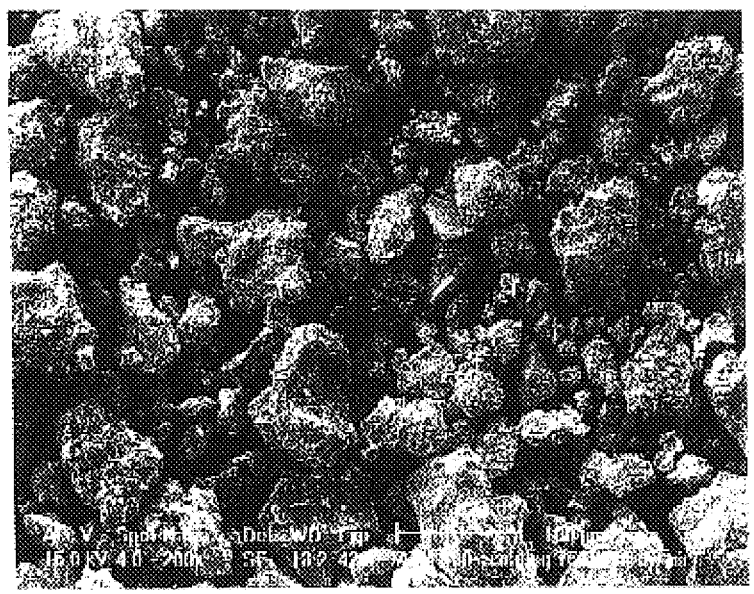
FIGS. 1A and 1B are scanning electronic microscope (SEM) pictures of a positive active material prepared according to Example 1 of the present invention.

A positive active material of the present invention includes a core including at least one compound represented by Formula 1 and a protective active metal oxide shell formed on the core:

Formula 1

$LiA_{1-x-y}B_xC_yO_2$, where $0 \leq x \leq 0.3$, and $0 \leq y \leq 0.01$;

A is an element selected from the group consisting of Co and Mn;

B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

The core preferably includes $LiCoO_2$, and a metal in the active metal oxide includes Mg, Al, Co, K, Na or Ca, and preferably Al. Thus, the preferred metal oxide is active $Al_2O_3$. The active metal oxide has an amorphous phase. The metal oxide is capable of stabilizing the active material.

A method of preparing the positive active material will be illustrated in more detail.

An A-metal salt is mixed with a B-metal salt in an equivalence ratio of between 70:30 and 100:0. Alternatively, a trace amount of a C-metal salt may be added to the mixture. If the B-metal salt is present over 30% of the sum of A- and B-metal salts, intercalation and deintercalation reactions of lithium ions do not proceed without changes in a crystalline structure of the resulting positive active material.

The mixing procedure is preferably performed by dispersing the A-, B- and C-metal salts in a suitable solvent and milling the resulting suspension by using an attritor.

Although the solvent may be any solvent in which the A-, B- and C-metal salts are not soluble, preferable examples include water, an alcohol or acetone. Here, the milling is performed at a sufficiently high rate for a sufficient period of time to allow uniform mixing, for example, 400 to 500 rpm for about 1 hour.

For example, a nickel salt such as nickel hydroxide, nickel nitrate, or nickel acetate may be used for the A-metal salt; for the B-metal salt, a cobalt salt such as cobalt hydroxide, cobalt nitrate or cobalt carbonate may be used; and for the C-metal salt, aluminum hydroxide or strontium hydroxide may be used.

The resulting suspension is dried in a drying furnace at about 120° C. for 24 hours and the dried material is ground to prepare an $A_{1-x-y}B_xC_y(OH)_2$ ($0 \leq x \leq 0.3$, $0 \leq y \leq 0.01$) powder. A lithium salt is added to the produced powder in a desired equivalence ratio and mechanically mixed. For example, the mixture of the lithium salt and $A_{1-x-y}B_xC_y(OH)_2$ is produced by mixing them in a mortar or grinder.

For the lithium salt, although any one of many simple lithium salts that react with $A_{1-x-y}B_xC_y(OH)2$ may be used, it is preferable to use lithium nitrate, lithium acetate or lithium hydroxide. In order to facilitate the reaction between the lithium salt and $A_{1-x-y}B_xC_y(OH)_2$ it is preferable that a suitable solvent such as ethanol, methanol, water or acetone is added, and then the mixture is mixed well by grinding in a mortar until excess liquid solvent disappears from the mixture.

The mixture of the lithium salt and $A_{1-x-y}B_xC_y(OH)_2$ is heat-treated at a temperature between 400 and 600° C., thereby producing a crystalline or semi-crystalline, positive active material precursor $LiA_{1-x-y}B_xC_yO_2$ powder.

Alternatively, the mixture of the lithium salt and $A_{1-x-y}B_xC_y(OH)_2$ is heat-treated for 1 to 5 hours at a temperature between 400 and 550° C. (first heat-treatment), and the resulting material is again heat-treated for 10 to 15 hours at a temperature between 700 and 900° C (second heat-treatment), thereby producing a crystalline or a semi-crystalline positive active material precursor $LiA_{1-x-y}B_xC_yO_2$ powder. If the first heat-treatment temperature is below 400 ° C., the metal salts do not react completely with the lithium salts, and if the second heat-treatment temperature is below 700° C., it is difficult to form the crystalline or the semi-crystalline material of Formula 1. The first and second heat-treatments are performed by increasing the temperature at a rate of 1 to 5° C. /min in a stream of air. The mixture is cooled slowly after turning off the heating source. Preferably, the $LiA_{1-x-y}B_xC_yO_2$ powder is then reground to distribute the lithium salts uniformly.

Subsequently, the crystalline or semi-crystalline $LiA_{1-x-y}B_xC_yO_2$ powder is coated with a metal alkoxide suspension. The coating process may be performed by dip-coating or by using any other general-purpose coating technique. Alternatively, the coating may also be achieved by a sputtering method, a chemical vapor deposition (CVD) method. Any other coating techniques, if available and applicable, may be as effective as the methods described herein, but it is preferable to use a dip-coating method using a metal alkoxide suspension since it is simple to use and economical.

The metal alkoxide suspension is prepared by mixing the metal or metal alkoxide powder with an alcohol at 1 to 10% by weight of the alcohol, preferably followed by refluxing the mixture. The metal of the metal alkoxide may be Mg, Al, Co, K, Na or Ca, preferably Al, and the alcohol may be methanol, ethanol or isopropanol. For the dip-coating process, if the concentration of the metal is less than 1% by weight, advantageous effects of coating the $LiA_{1-x-y}B_xC_yO_2$ powder with the metal alkoxide suspension are not sufficient, while if the concentration of the metal exceeds 10% by weight, the coating layer formed by the metal alkoxide suspension on the powder becomes too thick.

After dip-coating the crystalline or semi-crystalline powder with the alkoxide suspension, the wet powder is dried in an oven at 120° C. for about 5 hours. This drying step is performed to distribute lithium salt uniformly in the powder. The dried crystalline $LiA_{1-x-y}B_xC_yO_2$ powder with coating layer is heat-treated for 8 to 15 hours at a temperature between 400 and 900° C. In the case where the powder is crystalline, it is preferable that the heat-treating temperature is set between 400 and 600° C., whereas the preferable temperature is between 700 and 900° C. in the case where the powder is semi-crystalline.

By the heat-treating process, the metal alkoxide suspension is converted to metal oxide, and the semi-crystalline $LiA_{1-x-y}B_xC_yO_2$ powder is converted to a crystalline powder, resulting in the production of positive active material of Formula 1 in which metal oxide is coated on a surface of a crystalline $LiA_{1-x-y}B_xC_yO_2$ powder. The metal oxide formed on the surface of the active material can be either a composite metal oxide obtained from at least one of the A-, B- or C-metals and the metal alkoxide, or a metal oxide obtained from only the metal alkoxide. For example, by heat-treating $LiCoO_2$ coated with aluminum alkoxide, a positive active material of a composite metal oxide of cobalt and aluminum, and/or a positive active material with a surface on which aluminum oxide is coated, can be obtained. To produce a more uniform crystalline active material, it is preferable to dry in air or oxygen by blowing it thereon during the heat-treating process. If the heat-treating temperature is below 400 ° C., since the coated metal alkoxide suspension does not become crystallized, the resulting active material does not give good performance in a battery since the movement of lithium ions therein is hindered.

The resulting positive active material prepared by the process described above is made of agglomerated minute particles, the particle size being between 0.1 and 100 μm.

The following examples further illustrate the present invention.

EXAMPLE 1

$Ni(OH)_2$ powder and $Co(OH)_2$ powder were mixed in an equivalence ratio of 0.8:0.2 and dispersed in water, and the resulting material was mixed and milled by using an attritor for 60 minutes at 450 rpm. The resulting mixture was dried in a drying oven at 120° C. for about 24 hours, and the dried mixture having a composition of $Ni_{0.8}Co_{0.2}(OH)_2$ was evenly ground. To this powder, a stoichiometric amount of LiOH was added, followed by grinding the resultant powder mixture in a mortar to achieve an even blend.

The resultant powder mixture was heat-treated at 500° C. for about 5 hours to obtain a semi-crystalline powder of $LiNi_{0.8}Co_{0.2}O_2$. The semi-crystalline $LiNi_{0.8}Co_{0.2}O_2$ powder was then dip-coated with a Mg-methoxide suspension. The Mg-methoxide suspension was prepared by refluxing Mg powder of 4% by weight of methanol. The coated semi-crystalline powder was remixed at a high temperature in a stream of dry air to distribute lithium salt uniformly. The resulting material was then heat-treated for 12 hours at 750° C. in a stream of dry air to obtain a coated crystalline positive active material.

The positive active material, a conductive agent (carbon), a binder (polyvinylidene fluoride) and a solvent (N-methyl pyrrolidone) were mixed to prepare a positive active material slurry. The slurry was then cast into a tape on an Al foil current collector to manufacture a positive electrode. Using this positive electrode, a Li-metal counter electrode, a sheet of microporous polypropylene separator, and an electrolyte solution of 1M $LiPF_6$ in a 1:1 volume mixture of ethylene carbonate (EC) and dimethyl carbonate (DMC), a coin-type half-cell was fabricated.

EXAMPLE 2

A coin-type half-cell was fabricated by the same procedure as in Example 1, except that acetone was added to the mixture of the lithium salt and $Ni_{0.8}Co_{0.2}(OH)_2$, in order to facilitate the reaction between LiOH and $Ni_{0.8}Co_{0.2}(OH)_2$, and mortar/grinder mixing was performed until liquid acetone disappeared from the mixture, instead of dry grinding as in Example 1.

EXAMPLE 3

A coin-type half-cell was fabricated by the same procedure in Example 1, except that a mixture of lithium salt and $Ni_{0.8}Co_{0.2}(OH)_2$ was heat-treated for about five hours at 600° C. instead of 500° C. as in Example 1, to produce a semi-crystalline $LiNi_{0.8}Co_{0.2}O_2$ powder.

EXAMPLE 4

A coin-type half-cell was fabricated by the same procedure in Example 2, except that a mixture of lithium salt and $Ni_{0.8}Co_{0.2}(OH)_2$ was heat-treated for about five hours at 600° C., to produce a semi-crystalline $LiNi_{0.8}Co_{0.2}O_2$ powder.

EXAMPLE 5

$Ni(OH)_2$ and $Co(OH)_2$ were mixed in an equivalence ratio of 0.8:0.2 and dispersed in water. The resulting mixture was mixed well by milling with an attritor for about 60 minutes at 450 rpm. The mixed powder was dried in water in a drying oven at 120° C. for about 24 hours and the resulting dry mixture was evenly ground, thereby producing $Ni_{0.8}Co_{0.2}(OH)_2$. LiOH was added to the $Ni_{0.8}Co_{0.2}(OH)_2$ to provide 1 equivalent of lithium, and ethanol was added to facilitate a reaction between the LiOH and $Ni_{0.8}Co_{0.2}(OH)_2$ and the mixture was mortar/grinder mixed until liquid ethanol disappeared from the mixture.

Thereafter, the mixture was placed in an alumina crucible and heat-treated at 400 ° C. in a stream of dry air, and then heat-treated again for 12 hours at 750° C. In both the heat-treating processes, the temperature was raised at a rate of 3° C./min. The mixture was allowed to stand at the first and second heat-treating temperatures for predetermined times, and the mixture was slowly cooled to produce a $LiNi_{0.8}Co_{0.2}O_2$ powder.

The $LiNi_{0.8}Co_{0.2}O_2$ powder was then dipped in a Mg-methoxide suspension for about 10 minutes and the coated $LiNi_{0.8}Co_{0.2}O_2$ powder was then separated from the suspension. Subsequently, the powder was dried in an oven at 120° C. for about 5 hours, thereby producing $LiNi_{0.8}Co_{0.2}O_2$ powder coated with the Mg-methoxide. The powder was then heat-treated at a temperature of 500° C. for about 10 hours in a stream of dry air, thereby producing a positive active material.

Using the positive active material, a coin-type half-cell was fabricated according to the method used in Example 1.

EXAMPLE 6

A coin-type half-cell was fabricated by the same procedure in Example 5 except that $Ni(OH)_2$ was mixed with $Co(OH)_2$ in an equivalence ratio of 0.9:0.1, thereby producing a positive active material having a formula of $LiNi_{0.9}Co_{0.1}O_2$.

EXAMPLE 7

A coin-type half-cell was fabricated by the same procedure as in heat-treated at 600° C.

EXAMPLE 8

A coin-type half-cell was fabricated by the same procedure as in Example 6 except that the Mg-methoxide coated $LiNi_{0.9}Co_{0.1}O_2$ powder was heat-treated at 600° C.

Example 9

LiOH and $Co(OH)_2$ were mixed in a 1:1 mole ratio. A sufficient amount of ethanol was added to the mixture to fabricate the reaction, and the mixture was mixed in a mechanical mortar mixer for about 1 hour until liquid solvent disappeared from the mixture.

The mixed powder was placed in an aluminous crucible and heat-treated for 5 hours at 400° C. in a stream of dry air, then heat-treated again for 12 hours at 750° C. In both the heat-treating processes, the temperature was raised at a rate of 3° C./min. The mixture was allowed to stand at the first and the second heat-treating temperatures for predetermined period of time and was slowly cooled to produce a $LiCoO_2$ powder.

The $LiCoO_2$ powder was then dipped in a Mg-methoxide suspension for about 10 minutes, and the coated $LiCoO_2$ powder was then separated from the suspension. Subsequently, the powder was dried in an oven at 120° C. for about 5 hours, thereby producing $LiCoO_2$ powder coated with the Mg-methoxide. The powder was then heat-treated at a temperature of 600° C. for about 10 hours in a stream of dry air, thereby producing a positive active material.

Using the positive active material, a coin-type half-cell was fabricated according by the method used in Example 1

EXAMPLE 10

A coin-type half-cell was fabricated by the same procedure as in Example 9 except that the Mg-methoxide coated $LiCoO_2$ powder was heat-treated at a temperature of 700° C.

EXAMPLE 11

A coin-type half-cell was fabricated by the same procedure as in Example 5 except that the Mg-methoxide coated $LiNi_{0.8}Co_{0.2}O_2$ powder was heat-treated at a temperature of 700° C.

EXAMPLE 12

$Ni(OH)_2$, $Co(OH)_2$, and $Al(OH)_3$ were mixed in an equivalence ratio of 0.8:0.15:0.05 and dispersed in water. The resulting mixture was mixed well by milling with an attritor for about 60 minutes at 450 rpm. The mixed powder was dried in a drying oven at 120° C. for about 24 hours and the resulting dry mixture was evenly ground, thereby producing $Ni_{0.8}Co_{0.15}Al_{0.05}(OH)_2$. LiOH was added to the $Ni_{0.8}Co_{0.15}Al_{0.05}(OH)_2$ to make 1 equivalent of lithium per formula weight of the hydroxide, and ethanol was added to facilitate the reaction between the LiOH and $Ni_{0.8}Co_{0.15}Al_{0.05}(OH)_2$. The mixture was mixed in a mortar until liquid ethanol disappeared from the mixture.

The mixed mixture was placed in an alumina crucible and heat-treated at 400° C. in a stream of dry air, then heat-treated again for 12 hours at 750° C. In both heat-treating processes, the temperature was raised at a rate of 3° C./min. The mixture was allowed to stand at the first and the second heat-treating temperatures for predetermined period of time and was slowly cooled to produce a $LiNi_{0.8}Co_{0.15}Al_{0.05}O_2$ powder.

The $LiNi_{0.8}Co_{0.15}Al_{0.05}O_2$ powder was then dipped in a Mg-methoxide suspension for about 10 minutes and the coated $LiNi_{0.8}Co_{0.15}Al_{0.05}O_2$ powder was then separated from the suspension. Subsequently, the powder was dried in an oven at 120° C. for about 5 hours, thereby producing $LiNi_{0.8}Co_{0.15}Al_{0.05}O_2$ powder coated with the Mg-methoxide. The powder was then heat-treated at a temperature of 700° C. for about 10 hours in a stream of dry air, thereby producing a positive active material.

Using the positive active material, a coin-type half-cell was manufactured according to the method used in Example 1.

EXAMPLE 13

$Ni(OH)_2$, $Co(OH)_2$, and $Sr(OH)_2$ were mixed in an equivalence ratio of 0.9:0.098:0.002 and dispersed in water. The resulting mixture was mixed well by milling with an attritor for about 60 minutes at 450 rpm. The mixed powder was dried in a drying oven at 120° C. for about 24 hours, and the resulting dry mixture was evenly ground, thereby producing $Ni_{0.9}Co_{0.098}Sr_{0.002}(OH)_2$. LiOH was added to the $Ni_{0.9}Co_{0.098}Sr_{0.002}(OH)_2$ to provide 1 equivalent of lithium, and ethanol was added to facilitate a reaction between the LiOH and $Ni_{0.9}Co_{0.098}Sr_{0.002}(OH)_2$. The mixture was mixed in a mortar until liquid ethanol disappeared from the mixture.

Thereafter, the mixed mixture was placed in an alumina crucible and heat-treated at 400° C. in a stream of dry air, then heat-treated again for 12 hours at 750° C. In both the heat-treating processes, the temperature was raised at a rate of 3° C./min. The mixture was allowed to stand at the first and the second heat-treating temperatures for predetermined period of time, and the mixture was slowly cooled to produce a crystalline $LiNi_{0.9}Co_{0.098}Sr_{0.002}O_2$ powder.

The $LiNi_{0.9}Co_{0.098}Sr_{0.002}O_2$ powder was then dipped in a Mg-methoxide suspension for about 10 minutes and the coated $LiNi_{0.9}Co_{0.098}Sr_{0.002}O_2$ powder was then separated from the suspension. Subsequently, the powder was dried in an oven at 120° C. for about 5 hours, thereby producing $LiNi_{0.9}Co_{0.098}Sr_{0.002}O_2$ powder coated with the Mg-methoxide. The powder was then heat-treated at a temperature of $700°$ C. for about 10 hours in a stream of dry air, thereby producing of a positive active material.

Using the positive active material, a coin-type half-cell was manufactured according to the method used in Example 1.

EXAMPLE 14

A commercial $LiCoO_2$ powder having average particle diameter of 5 $\mu$m was dipped in a Mg-methoxide suspension for about 10 minutes and the coated $LiCoO_2$ powder was then separated from the suspension. This powder was then dried in an oven at 120° C. for about 5 hours, thereby producing $LiCoO_2$ powder coated with Mg-methoxide. The Mg-methoxide coated $LiCoO_2$ powder was subsequently heat-treated for about 10 hours at 600° C. in a stream of dry air to produce a positive active material.

EXAMPLE 15

A commercial $LiCoO_2$ powder having average particle diameter of 5 $\mu$m was dipped in an Al-isopropoxide suspension for about 10 minutes, and the coated $LiCoO_2$ powder was then separated from the suspension. This powder was then dried in an oven at 120° C. for about 5 hours, thereby producing $LiCoO_2$ powder coated with Al-isopropoxide. The Al-isopropoxide $LCoO_2$ powder was subsequently heat-treated for about 10 hours at 600° C. in a stream of dry air to produce a positive active material.

EXAMPLE 16

A commercial $LiCoO_2$ powder having average particle diameter of 10 $\mu$m was dipped in a Mg-methoxide suspension for about 10 minutes and then separated from the suspension. This powder was then dried in an oven at 120° C. for about 5 hours, thereby producing $LiCoO_2$ powder coated with Mg-methoxide. The Mg-methoxide $LiCoO_2$ powder was subsequently heat-treated for about 10 hours at 600° C. in a stream of dry air to produce a positive active material.

The positive active material, a conductive agent (carbon, product name: Super P), a binder (polyvinylidene fluoride, product name: KF-1300) and a solvent (N-methyl pyrrolidone) were mixed to produce a positive active material slurry. The slurry was then cast into a tape on an Al foil to prepare a positive electrode.

Using the positive electrode; a negative electrode made from MCF (meso-carbon fiber) material; an organic electrolyte including 1M $LiPF_6$ in a mixture of ethylene carbonate, dimethyl carbonate and diethyl carbonate in a 3:3:1 volume ratio; and a sheet of microporous polypropylene separator (Ashai Company), a 18650-size cylindrical cell having a capacity of 1650mAh was fabricated. The cycle-life characteristics of this cell were then measured at 1C rate in the voltage range of 2.75 to 4.2V.

EXAMPLE 17

$LiCoO_2$ powder having average particle diameter of 5 $\mu$m was dipped in an Al-isopropoxide suspension for about 10 minutes and then separated from the suspension. This powder was then dried in an oven at 120° C. for about 5 hours, thereby producing $LiCoO_2$ powder coated with Al-isopropoxide. The Al-isopropoxide coated $LiCoO_2$ powder was subsequently heat-treated for about 10 hours at 600° C. in a state where dry air was blown on the powder to produce active material for a positive electrode used in lithium-ion cell.

Using this active material, a positive electrode and a cell were fabricated using the same method as in Example 16.

EXAMPLE 18

$Ni(OH)_2$ and $Co(OH)_2$ were mixed in an equivalence ratio of 0.8:0.2 and dispersed in water. The mixture was mixed well by milling with an attritor for about 60 minutes at 450 rpm. The mixed powder was dried in a drying oven at 120° C. for about 24 hours and the resulting dried mixture was evenly ground, thereby producing $Ni_{0.8}Co_{0.2}(OH)_2$. LiOH was added to the $Ni_{0.8}Co_{0.2}(OH)_2$ to make 1 equivalent of lithium per formula weight of the hydroxide, and ethanol was added to facilitate the reaction between the LiOH and $Ni_{0.8}Co_{0.2}(OH)_2$. The mixture was mixed in a mortar until liquid ethanol disappeared from the mixture.

Thereafter, the mixed mixture was placed in an alumina crucible and heat-treated at 400° C. in a stream of dry air, then heat-treated again for 12 hours at 750° C. In both the heat-treating processes, the temperature was raised at a rate of 3° C./min. The mixture was allowed to stand at the first and the second heat-treating temperatures for predetermined period of time, and the mixture was slowly cooled to produce a $LiNi_{0.8}Co_{0.2}O_2$ powder.

The $LiNi_{0.8}Co_{0.2}O_2$ powder was then dipped in a Mg-methoxide suspension for about 10 minutes, and then separated from the suspension. Subsequently, the powder was dried in an oven at 120° C. for about 5 hours, thereby producing $LiNi_{0.8}Co_{0.2}O_2$ powder coated with the Mg-methoxide. The powder was then heat-treated at a temperature of 500° C. for approximately 10 hours in a stream of dry air, thereby producing a positive active material.

The positive active material, a conductive agent (carbon, product name: Super P), a binder (polyvinylidene fluoride, product name: KF-1300) and a solvent (N-methyl pyrrolidone) were mixed to produce a positive active material slurry. The slurry was then cast into a tape on an Al foil to prepare a positive electrode.

Using this positive electrode, a negative electrode made from MCF (meso-carbon fiber) material, an organic electrolyte including 1M $LiPF_6$ in a mixture of ethylene carbonate, dimethyl carbonate and diethyl carbonate in a 3:3:1 volume ratio, and a sheet of microporous polypropylene separator (Ashai Company), a 18650-size cylindrical cell having a capacity of 1650 mAh was fabricated. The cycle-life characteristics of this cell were then measured at 1C rate in the voltage range of 2.75 to 4.2V.

EXAMPLE 19

A coin-type half-cell was fabricated by the same procedure as in Example 8 except that $LiNi_{0.9}Co_{0.1}O_2$ was coated with an Al-isopropoxide suspension.

EXAMPLE 20

A coin-type half-cell was fabricated by the same procedure as in Example 9 except that an Al-isopropoxide suspension was used instead of the Mg-methoxide suspension.

EXAMPLE 21

A coin-type half-cell was fabricated by the same procedure as in Example 10 except that an Al-isopropoxide suspension was used instead of the Mg-methoxide suspension.

EXAMPLE 22

A coin-type half-cell was fabricated by the same procedure as in Example 14 except that an Al-isopropoxide suspension was used instead of the Mg-methoxide suspension.

EXAMPLE 23

A coin-type half-cell was fabricated by the same procedure as in Example 16 except that an Al-isopropoxide suspension was used instead of the Mg-methoxide suspension.

Comparative Example 1

A coin-type half-cell was fabricated by the same procedure as in Example 1 except that the step of coating the semi-crystalline $LiNi_{0.8}Co_{0.2}O_2$ powder with the Mg-methoxide suspension was omitted.

Comparative Example 2

A coin-type half-cell was fabricated by the same procedure as in Example 2 except that the step of coating the semi-crystalline $LiNi_{0.8}Co_{0.2}O_2$ powder with the Mg-methoxide suspension was omitted.

Comparative Example 3

A coin-type half-cell was fabricated by the same procedure as in Example 5 except that the step of coating the semi-crystalline $LiNi_{0.8}Co_{0.2}O_2$ powder with the Mg-methoxide suspension was omitted.

Comparative Example 4

$Ni(OH)_2$, $Co(OH)_2$, and $Mg(OH)_2$ were mixed in an equivalence ratio of 0.8:0.15:0.05 and dispersed in water. The resulting mixture was mixed well by milling with an attritor for about 60 minutes at 450 rpm. The mixed powder was dried in a drying oven at 120° C. for about 24 hours and the resulting dry mixture was evenly ground, thereby producing $Ni_{0.8}Co_{0.15}Mg_{0.05}(OH)_2$. LiOH was added to the $Ni_{0.8}Co_{0.15}Mg_{0.05}(OH)_2$ to make 1 equivalent of lithium per formula weight of the hydroxide, and ethanol was added to facilitate a reaction between the LiOH and $Ni_{0.8}Co_{0.15}Mg_{0.05}(OH)_2$. The mixture was mixed in a mortar until liquid ethanol disappeared from the mixture. The mixed mixture was placed in an alumina crucible and heat-treated at 400° C. in a stream of dry air, then heat-treated again for 12 hours at 750° C. to produce a positive active material.

Using the positive active material, a coin-type half-cell was fabricated according to the method used in Example 1.

Comparative Example 5

A coin-type half-cell was fabricated by the same procedure as in Example 9 except that the step of coating the semi-crystalline $LiCoO_2$ powder with the Mg-methoxide suspension was omitted.

Comparative Example 6

A coin-type half-cell was fabricated by the same procedure as in Example 11 except that the step of coating the semi-crystalline $LiNi_{0.8}Co_{0.2}O_2$ powder with the Mg-methoxide suspension was omitted.

Comparative Example 7

A coin-type half-cell was fabricated by the same procedure as in Example 12 except that the step of coating the semi-crystalline $LiNi_{0.8}Co_{0.15}Al_{0.05}O_2$ powder with the Mg-methoxide suspension was omitted.

Comparative Example 8

A coin-type half-cell was fabricated by the same procedure as in Example 13 except that the step of coating the semi-crystalline $LiNi_{0.9}Co_{0.098}Sr_{0.002}O_2$ powder with the Mg-methoxide suspension was omitted.

Comparative Example 9

$LiCoO_2$ powder having average particle diameter of 5 $\mu$m was used as a positive active material for a coin-type half-cell.

Comparative Example 10

A coin-type half-cell was fabricated by the same procedure as in Example 16 except that the step of coating the semi-crystalline $LiCoO_2$ powder with the Mg-methoxide suspension was omitted.

Comparative Example 11

A cell as disclosed in the Matsushita Technical Journal Vol. 44, August 1998, pp. 407–412 was used for Comparative Example 11.

Comparative Example 12

A 18650-size cylindrical cell was fabricated by the same procedure as in Example 18 except that the step of coating the semi-crystalline $LiNi_{0.8}Co_{0.2}O_2$ powder with the Mg-methoxide suspension was omitted.

Comparative Example 13

A coin-type half-cell was fabricated by the same procedure as in Example 19 except the step of coating the semi-crystalline $LiNi_{0.9}Co_{0.1}O_2$ powder with the Al-isopropoxide suspension was omitted.

Comparative Example 14

$LiCoO_2$ was mixed a commercial $Al_2O_3$. Using the resulting mixture, a coin-type half-cell was fabricated by the same procedure as in Comparative example 1.

Comparative Example 15

LiCoO$_2$ powder was intimately mixed by grinding with about 1% by weight of Al$_2$O$_3$ and the mixture was then briefly heated at about 800° C. for 1 hour to positive active material. Using the resulting positive active material, a coin-type coin-cell was fabricated by the same procedure as in Comparative example 1.

Figure 1B:
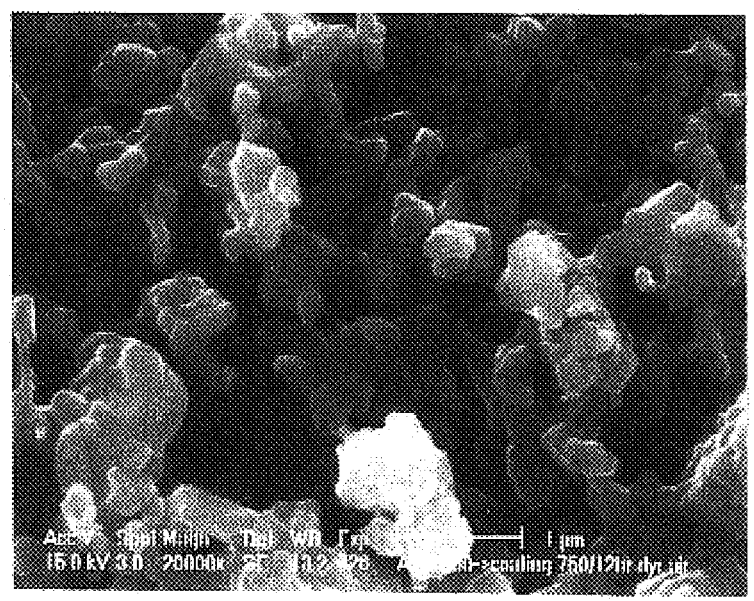
Figure 2A:
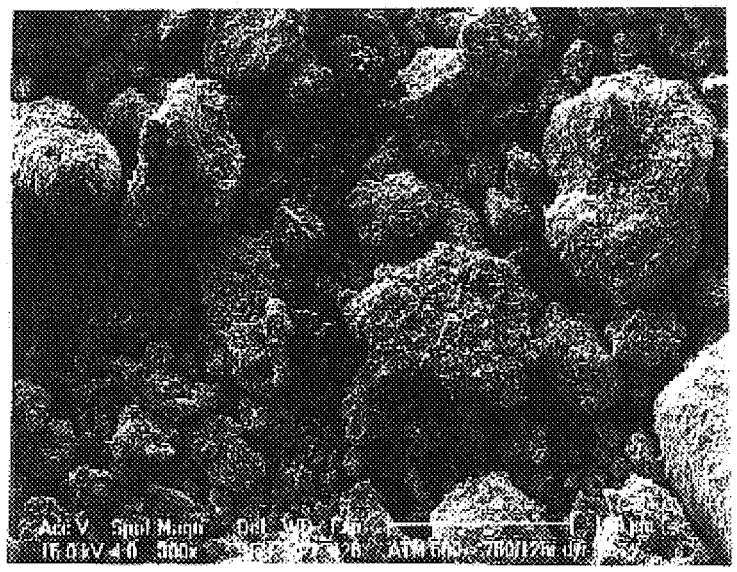
FIGS. 2A and 2B are SEM pictures of a positive active material prepared according to Comparative Example 1.
Figure 2B:
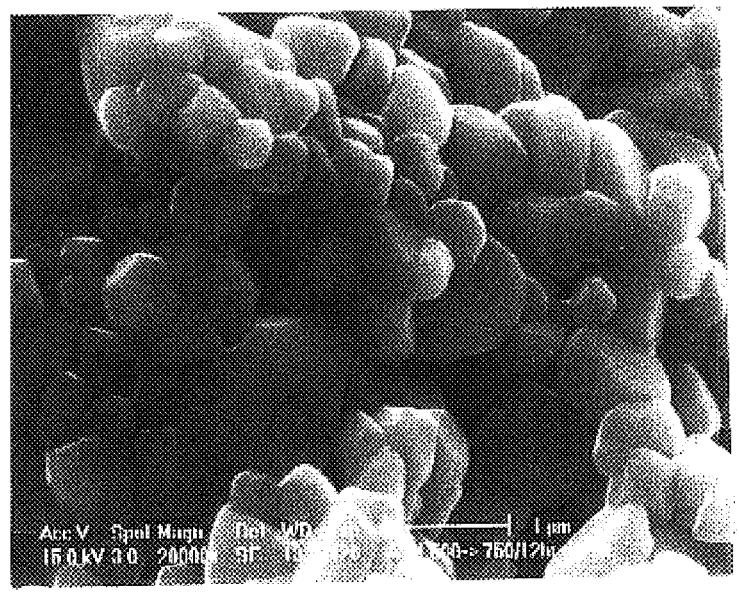

FIGS. 1A and 1B show SEM pictures, respectively 200-times and 20,000-times expanded view of the positive active material according to Example 1; and FIGS. 2A and 2B show SEM pictures, respectively 300-times and 20,000-times expanded view of the positive active material according to Comparative Example 1. As shown in FIGS. 1A and 2A, the positive active material according to Example 1 is comprised of clumps that are less than 100 μm in size, whereas the positive active material according to Comparative Example 1 is comprised of clumps that are greater than 100 μm in size. Further, as shown in FIG. 1B, the positive active material according to Example 1 is comprised of ultra-fine particles of 0.1 to 0.2 μm in size which aggregate mass together to form small particles of 0.5 to 1 μm in size. On the other hand, as shown in FIG. 2B, the positive active material according to Comparative Example 1 is comprised of particles that are greater than 1 μm in size which aggregate together into clumps.

Figure 3:
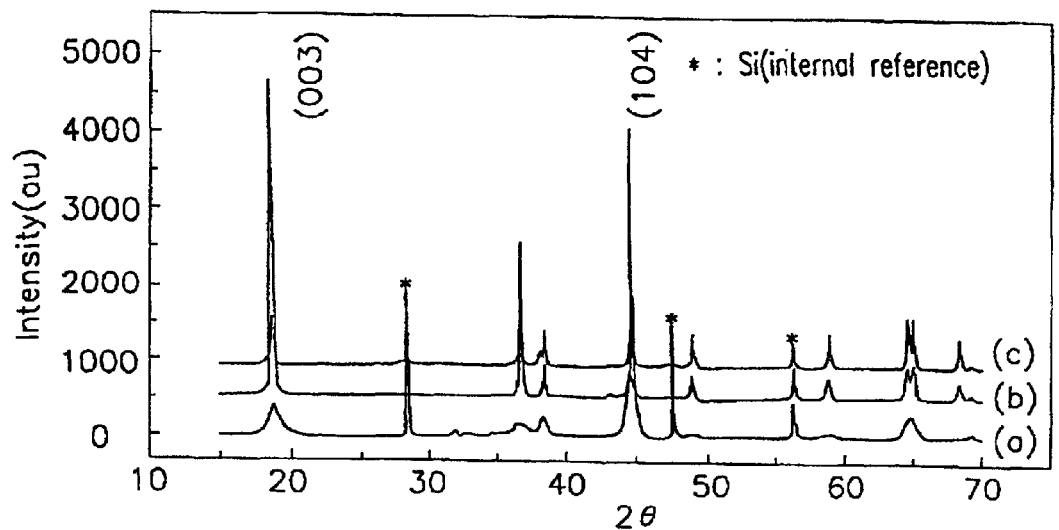
FIG. 3 is a graph illustrating XRD patterns of positive active materials prepared according to Example 2(b) of the present invention, Comparative Example 2 (c), and semi-crystalline $LiNi_{0.8}BC_{0.2}O_2$ (a)

FIG. 3 shows a graph of XRD patterns of the positive active material according to Example 2 and Comparative Example 2. As shown in the drawing, an XRD pattern (a in FIG. 3) of the semi-crystalline LiNi$_{0.8}$Co$_{0.2}$O$_2$ powder produced by mixing LiOH and Ni$_{0.8}$Co$_{0.2}$(OH)$_2$ in the acetone solvent followed by heat-treating at a temperature of 500° C. for the first heat-treatment step only is broad and has peaks that are not significantly high, indicative of a semi-crystalline state. Further, an XRD pattern (b in FIG. 3) of the LiNi$_{0.8}$Co$_{0.2}$O$_2$ powder produced by mixing LiOH and Ni$_{0.8}$Co$_{0.2}$(OH)$_2$ in the acetone solvent then heat-treating at a temperature of 500° C. for the first heat-treatment step and heat-treating at a temperature of 750° C. for the second heat-treatment step has sharp peaks, which indicates a complete crystalline state. This XRD pattern is substantially identical to an XRD pattern (c in FIG. 3) of the crystalline positive active material of Comparative Example 2 in which Mg is not coated. Since the XRD pattern of the positive active material of Example 2 (b in FIG. 3) is identical to that of the active material in which Mg is not coated (c in FIG. 3), the results indicate that the Mg-oxide does not penetrate into the crystalline structure of the positive active material, but coats the surface of the crystalline structure. In FIG. 3, "*" indicates Si reference peaks.

Figure 4:
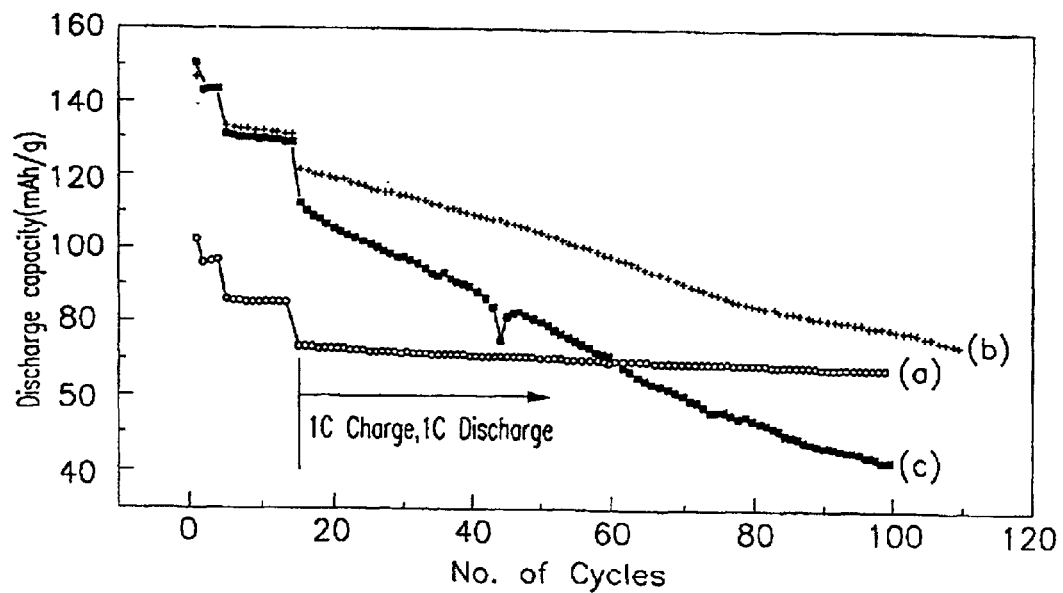
FIG. 4 is a graph illustrating cycle-life characteristics of cells prepared according to Example 1 (a) and Example 3(b) of the present invention, and Comparative Example 1 (c)

FIG. 4 shows a graph of cycle-life characteristics of coin-type cells prepared according to Example 1 (a in FIG. 4), Example 3 (b in FIG. 4) and Comparative Example 1 (c in FIG. 4). A capacity and a cycle life of each of the cells were measured by charging-discharging the cells in the voltage range of 2.8V to 4.3V, at 0.1C (1 cycle), 0.2C (3 cycles), 0.5C (10 cycles), and 1C (85 cycles) rates. As shown in FIG. 4, when charge and discharge at a high rate of 1C, the capacity of the cell according to Example 1 reduced from 72.8 mAh/g to 66.8 mAh/g (approximately 8%) after 85 cycles, and the capacity of the cell according to Example 3 reduced from 122 mAh/g to 77.5 mAh/g (approximately 36%) after 85 cycles. On the other hand, the capacity of the cell according to Comparative Example 1 reduced from 111.9 mAh/g to 42.6 mAh/g (approximately 60%) after 85 cycles. In summary, the results indicate that the positive active materials of Examples 1 and 3 are more stable in high-rate cycling, therefore improved cycle-life over that of Comparative Example 1.

Figure 5A:
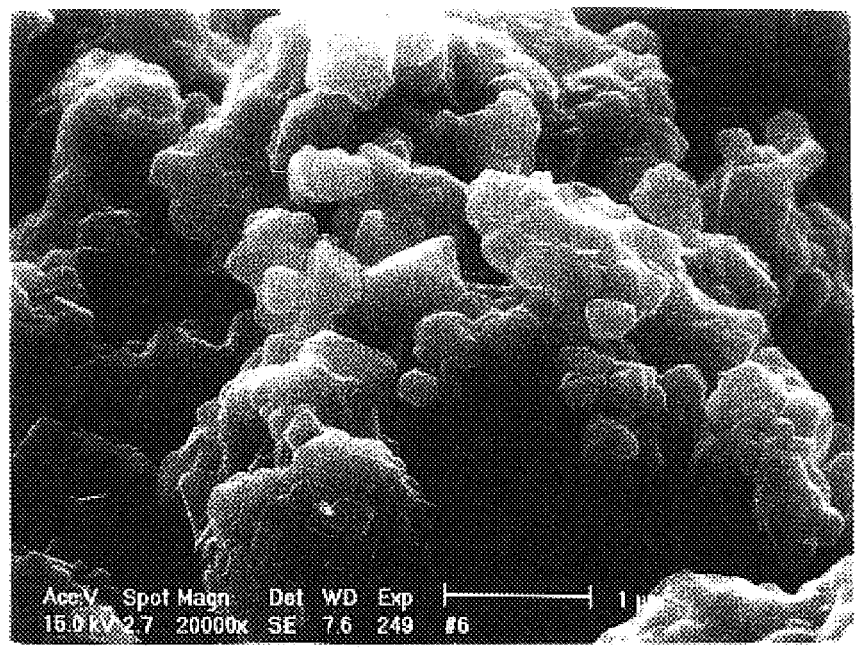
FIGS. 5A and 5B are SEM pictures of positive active materials prepared according to Example 5 of the present invention and Comparative Example 3, respectively.
Figure 5B:
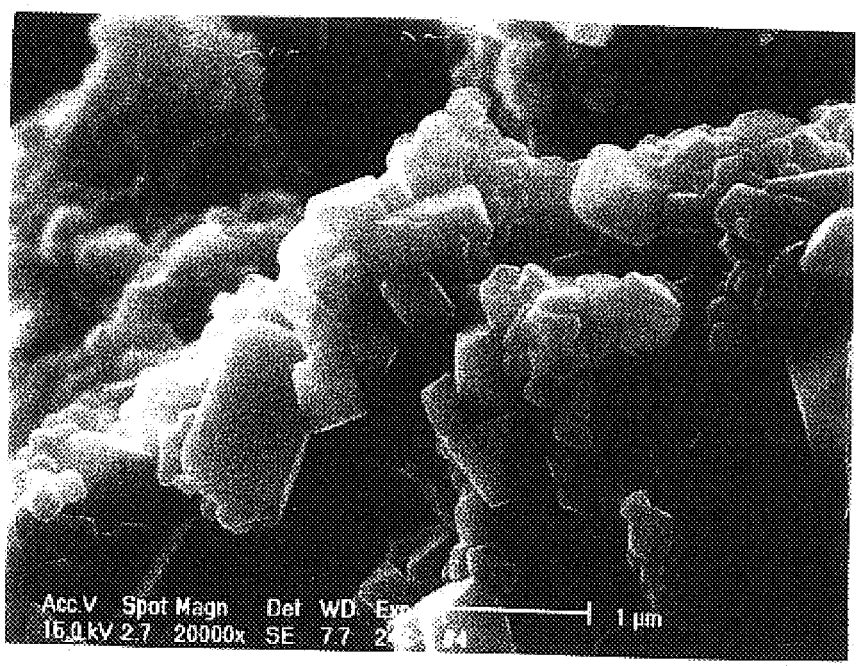

FIGS. 5A and 5B show SEM pictures of the positive active material according to Example 5 and Comparative Example 3, respectively. As shown in FIGS. 5A and 5B, the surface of the active material of Example 5 is apparently different from the surface of the active material of Comparative Example 3 as a result of the metal oxide coating on the surface of the active material.

Figure 6:
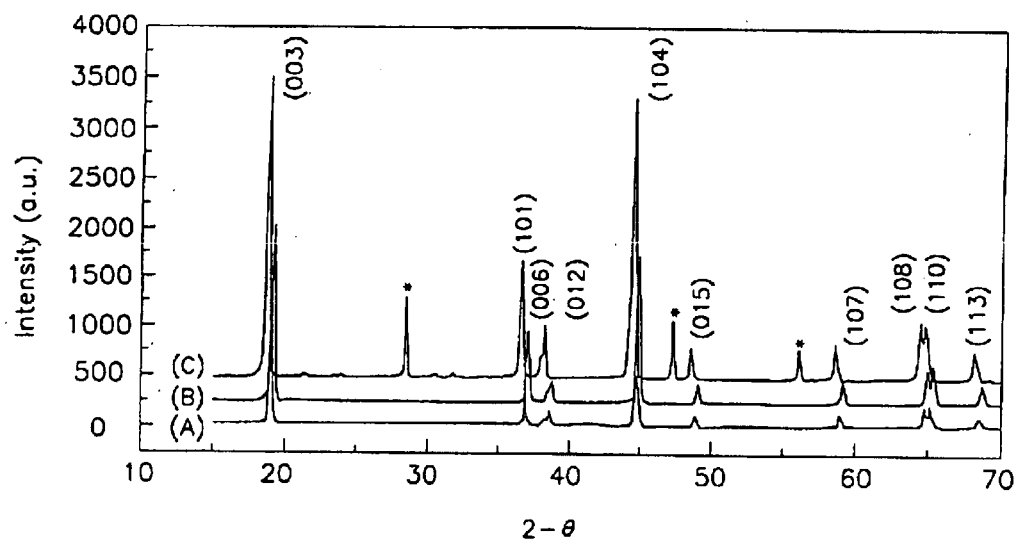
FIG. 6 is a graph illustrating XRD patterns of positive active materials prepared according to Example 5 (A) of the present invention and Comparative Example 3 (B) and Comparative Examples 4 (C)

XRD patterns of the positive active materials of Example 5, Comparative Example 3 and Comparative Example 4 are shown respectively by lines (A), (B) and (C) of FIG. 6. In FIG. 6, "*" indicates Si reference peaks. In FIG. 6, with regard to lattice parameters, a-axis is 2.876 and c-axis is 14.151 in the case of (a), a-axis is 2.883 and c-axis is 14.150 in the case of (b), and a-axis is 2.872 and c-axis is 14.204 in the case of (c). As shown in FIG. 6, significantly different XRD patterns are shown for the positive active material of Example 5 (A) compared to the XRD patterns of the positive active material of Comparative Example 4 (C) in which Mg is doped within the structure of the active material instead of being coated, whereas the XRD pattern of the active material of Example 5 is substantially identical to that of the active material of Comparative Example 3 (B) in which Mg is neither doped nor coated on the active material. The results indicate that the active material of Example 5 maintains the structure of the original active material which is not coated with Mg indicating that the Mg stay at the surface without penetrating into the bulk of the material. The results also indicate that the electro-chemical characteristics, are improved by the surface coating.

Figure 7:
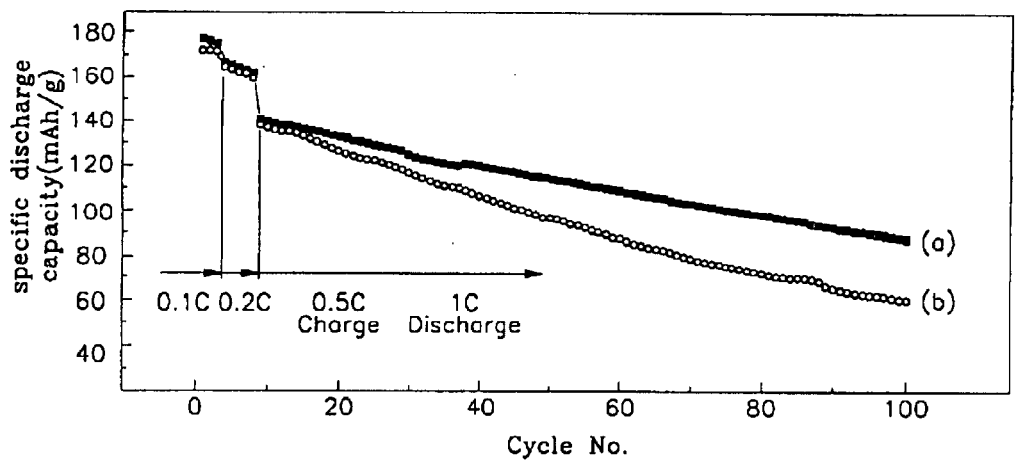
FIG. 7 is a graph illustrating cycle-life characteristics of cells prepared according to Example 5 (a) of the present invention and Comparative Example 3 (b)

FIG. 7 shows a graph of cycle-life characteristics of the cells according to Example 5 and Comparative Example 3 in the voltage range of 2.8V to 4.3V. In FIG. 7, the curve (a) corresponds to Example 5 and the curve (b) corresponds to Comparative Example 3. As shown in FIG. 7, the capacity of the cell for 1C-rate cycling of Example 5 reduced from 140 mAh/g to 90 mAh/g, while that of Comparative Example 3 reduced from 140 mAh/g to 60 mAh/g, showing that the cell capacity of Example 5 has reduced significantly more than that of Comparative Example 3 in the 1C-rate cycling.

Figure 8:
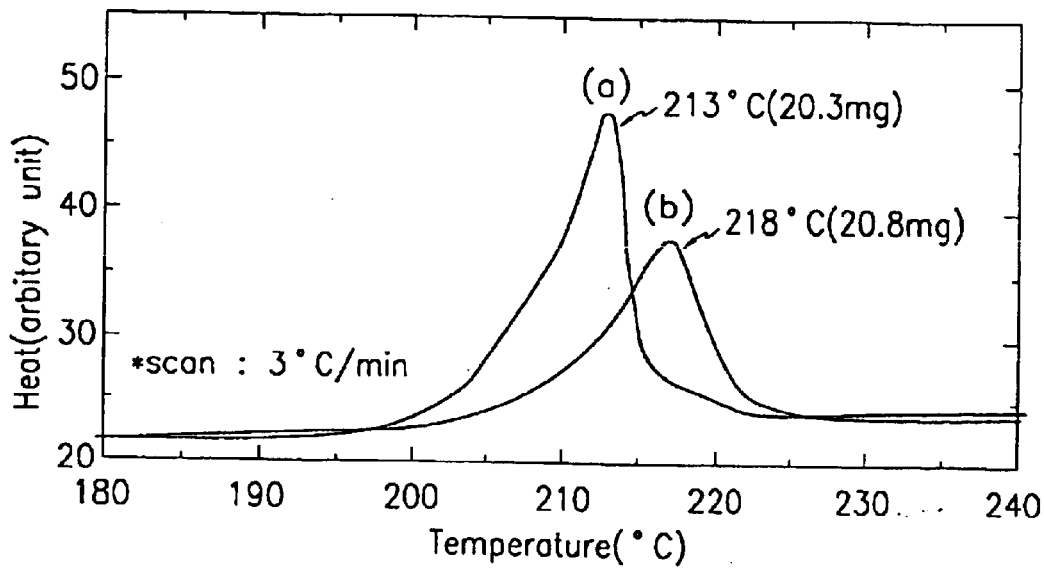
FIG. 8 is a graph illustrating differential scanning calorimetry (DSC) analysis results of positive electrodes prepared according to Example 9 (b) of the present invention and Comparative Example 5 (a)

FIG. 8 shows DSC analysis results of the cells according to Example 9 (b in FIG. 8) and Comparative Example 5 (a in FIG. 8). These results were obtained using electrodes from the cells charged at 4.1V. The DSC analysis result illustrates the thermal stability of individual sample cells. After charging the cell, the positive active material is converted from LiCoO$_2$ to Li$_{1-x}$CoO$_2$ ($0.5 \leq x < 1$). The charged active material, Li$_{1-x}$CoO$_2$, becomes unstable as temperature is increased releasing oxygen gas due to weakened Co—O bonds, showing an exothermic peak in the DSC curve. The released oxygen may react with the electrolyte in the cell causing the cell to explode in the worst case. Both the peak temperature and the peak size which represent the amount of heat released are a measure of the instability of the charge material of the cell.

As shown in FIG. 8, the exothermic peak temperature for Comparative Example 5 is about 213° C., while that for Example 9 is about 5° C. higher (approximately 218° C.) than that for Comparative Example 5. The amount of heat released (peak size) for Example 9 is about half that of Comparative Example 5. It is apparent that the Mg coating on the LiCoO$_2$ powder improve the stability of the charged active material, Li$_{1-x}$CoO$_2$. This improved stability might be due to the fact that the cobalt-magnesium coating layer may limit the access of the charged positive active material to the electrolyte, thereby reducing the oxidation of the electrolyte.

Figure 9:
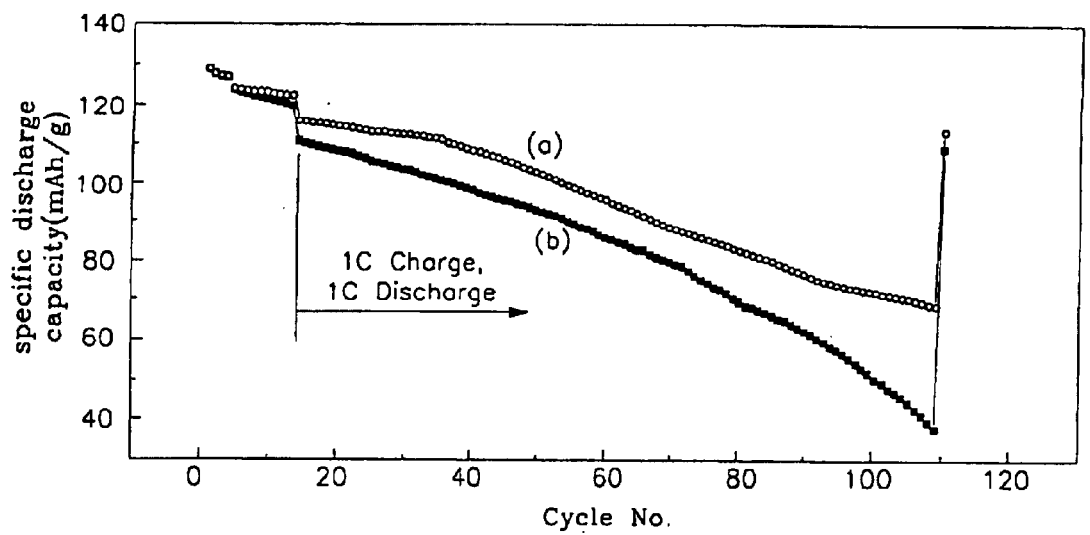
FIG. 9 is a graph illustrating cycle-life characteristics of cells prepared according to Example 9 (a) of the present invention and Comparative Example 5(b) for charge and discharge in the voltage range of 4.1 to 2.75V.

FIG. 9 shows a graph illustrating cycle-life characteristics during charging and discharging the cells of Example 9 and Comparative Example 5 in the voltage range of 2.75V to 4.1V. In FIG. 9, (a) corresponds to the cell of Example 9, while (b) corresponds to the cell of Comparative Example 5. In the case of Comparative Example 5, during 100 charge-discharge cycles at 1C rate, the capacity of the cell is reduced from 108 mAh/g to 38 mAh/g (a reduction of 65%), whereas the capacity of the cell of Example 9 is reduced from 114 mAh/g to 70 mAh/g (a reduction of 39%) under similar cycling conditions. Relative to Comparative Example 5, the capacity fading of Example 9 is considerably smaller at a high rate (1C rate), therefore showing improved cycle life.

Figure 10:
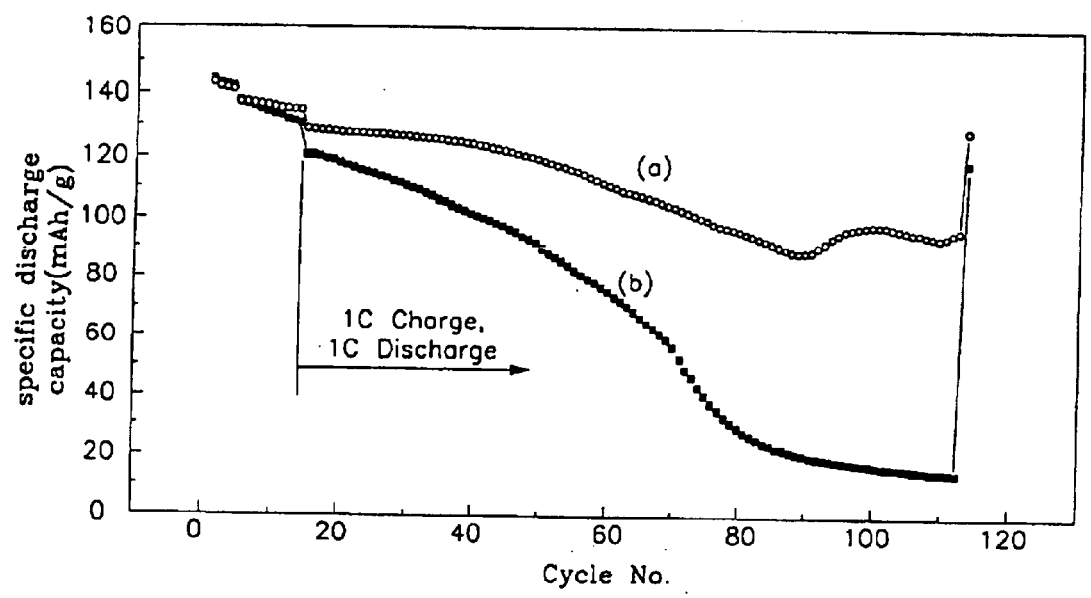
FIG. 10 is a graph illustrating cycle-life characteristics of cells prepared according to Example 9 (a) of the present invention and Comparative Example 5 (b) for charge and discharge in the voltage range of 4.2 to 2.75V.

FIG. 10 shows a graph illustrating cycle-life characteristics during charging and discharging in the voltage range of 2.75V to 4.2V of the cell according to Example 9 and Comparative Example 5. In FIG. 10, the curve (a) corresponds to the cell of Example 9 and the curve (b) corresponds to the cell of Comparative Example 5. In the case of Comparative Example 5, after 100 charge-discharge cycles at 1C rate, the capacity of the cell reduced from 120 mAh/g to 15 mAh/g (a reduction of 88%), whereas the capacity of the cell of Example 9 is reduced from 129 mAh/g to a low of 96 mAh/g (a reduction of only 26%). Accordingly, relative to Comparative Example 5, the capacity fading is considerably smaller at a high rate and cycle life is significantly greater for Example 9.

Figure 11:
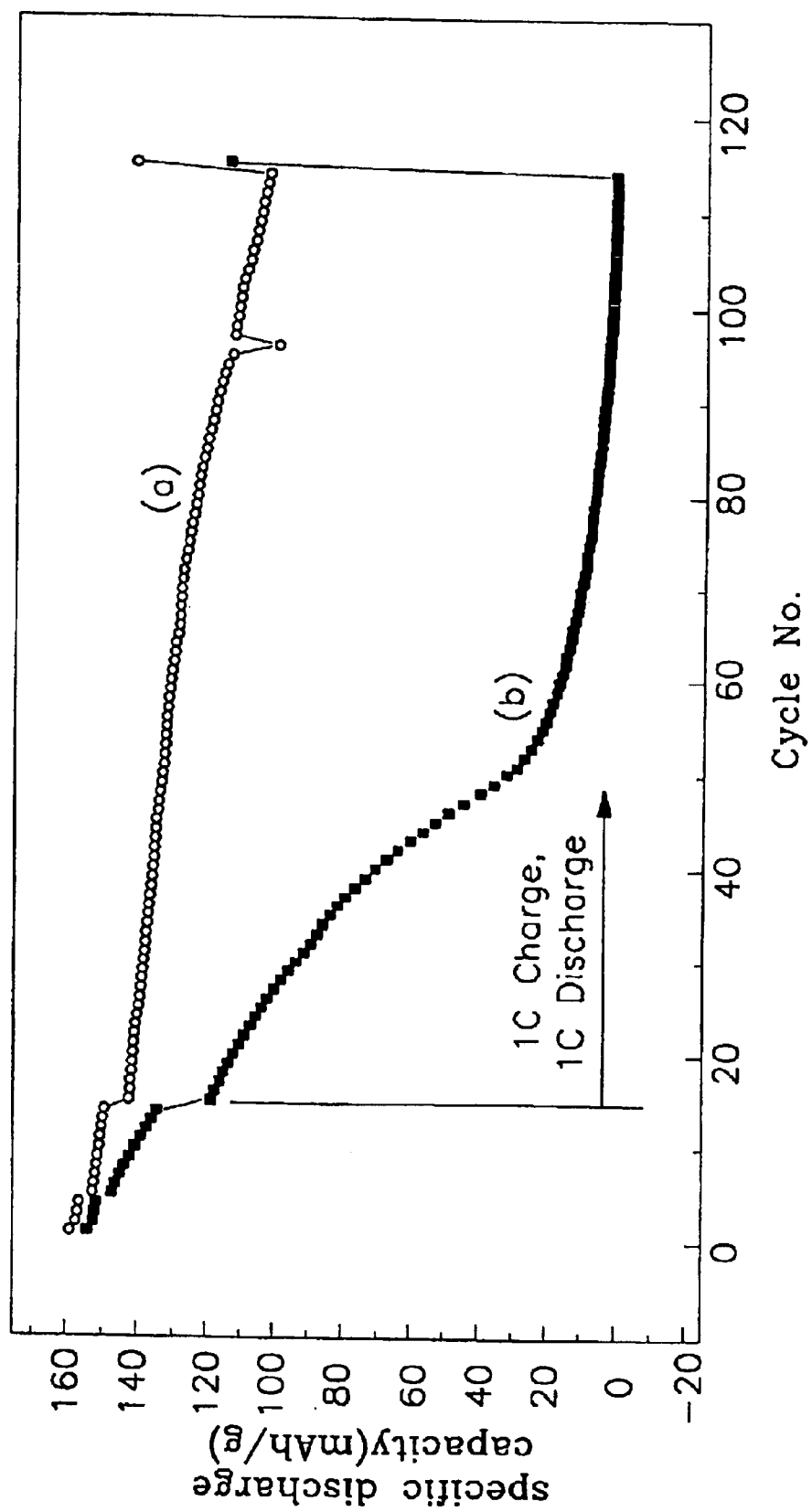
FIG. 11 is a graph illustrating cycle-life characteristics of cells prepared according to Example 9 (a) of the present invention and Comparative Example 5 (b) for charge and discharge in the voltage range of 4.3 to 2;75V.

FIG. 11 shows a graph of cycle-life characteristics during charging and discharging in the voltage range of 2.75V to 4.3V of the cells according to Example 9 and Comparative Example 5. In FIG. 11, the curve (a) corresponds to the cell of Example 9 and the curve (b) corresponds to the cell of Comparative Example 5. Accordingly, relative to Comparative Example 5, the capacity fading is considerably smaller at a high rate and cycle life is significantly greater for Example 9.

Figure 12:
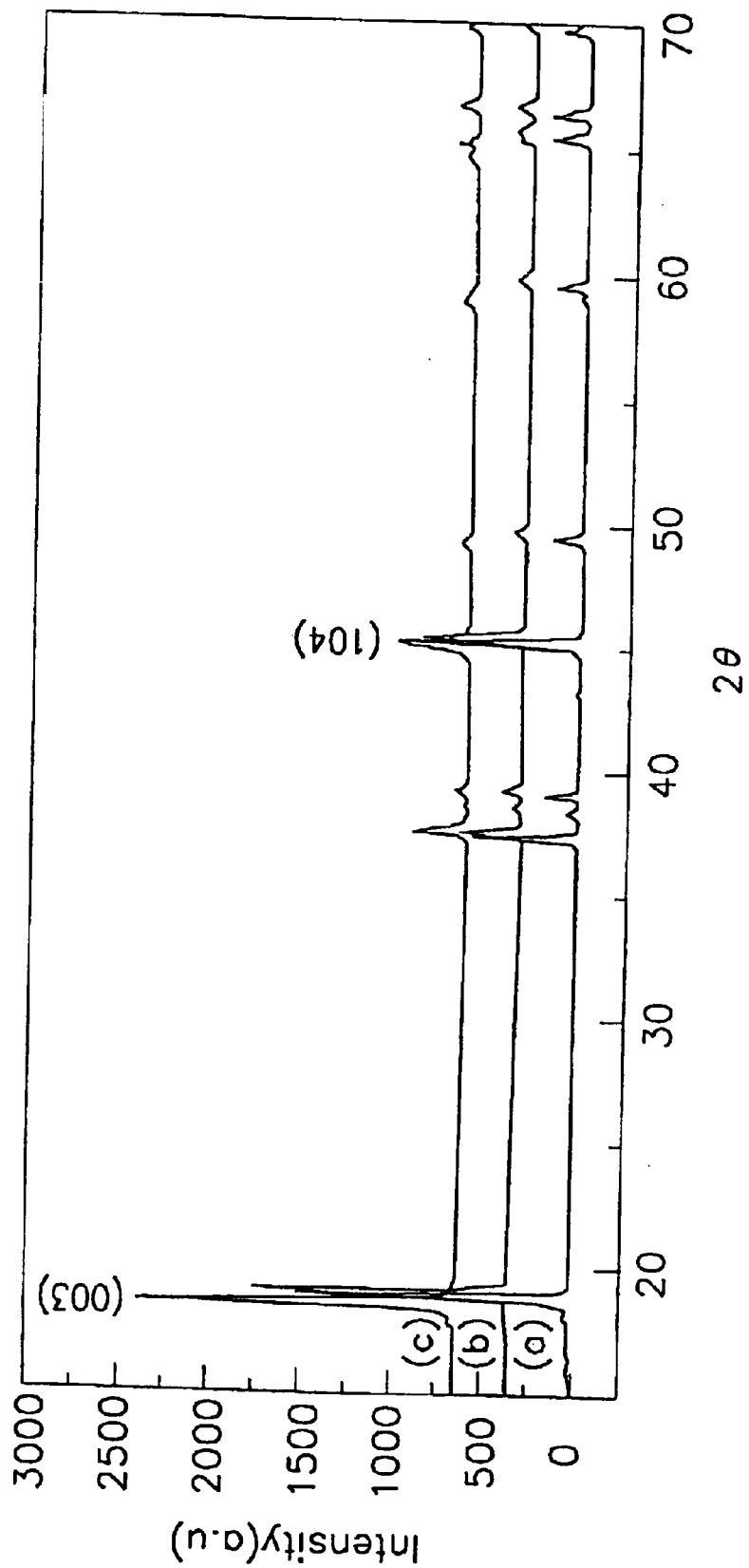
FIG. 12 is a graph illustrating XRD patterns of positive active materials of Comparative Example 5 (a) before charging, and Example 10 (b) of the present invention after charging at 4.2V and Comparative Example 5 (c) after 1 cycle charging at 4.2V.

FIG. 12 illustrates XRD analysis results of the positive active materials according to 10 and Comparative Example 5. The curve (a) indicates XRD analysis results of the LiCoO$_2$ positive active material according to Comparative Example 5. The curve (b) indicates XRD analysis results of the positive active material according to 10 after the cell was charged at 4.2V, and the curve (c) indicates XRD analysis results of the positive active material according to Comparative Example 5 after the cell was charged at 4.2V. As shown in (a) and (c) of FIG. 12, it indicates that as a result of charging, the structure of LiCoO$_2$ changes from a hexagonal structure to a monoclinic structure (reference, J. Electro. Chem. Soc. Vol. 143, No. 3, 1006, p. 1114–1122). On the other hand, the LiCoO$_2$ powder of 10 maintains its hexagonal structure even after charging, indicative of a stable surface obtained as a result of the coating of the magnesium oxide.

Figure 13:
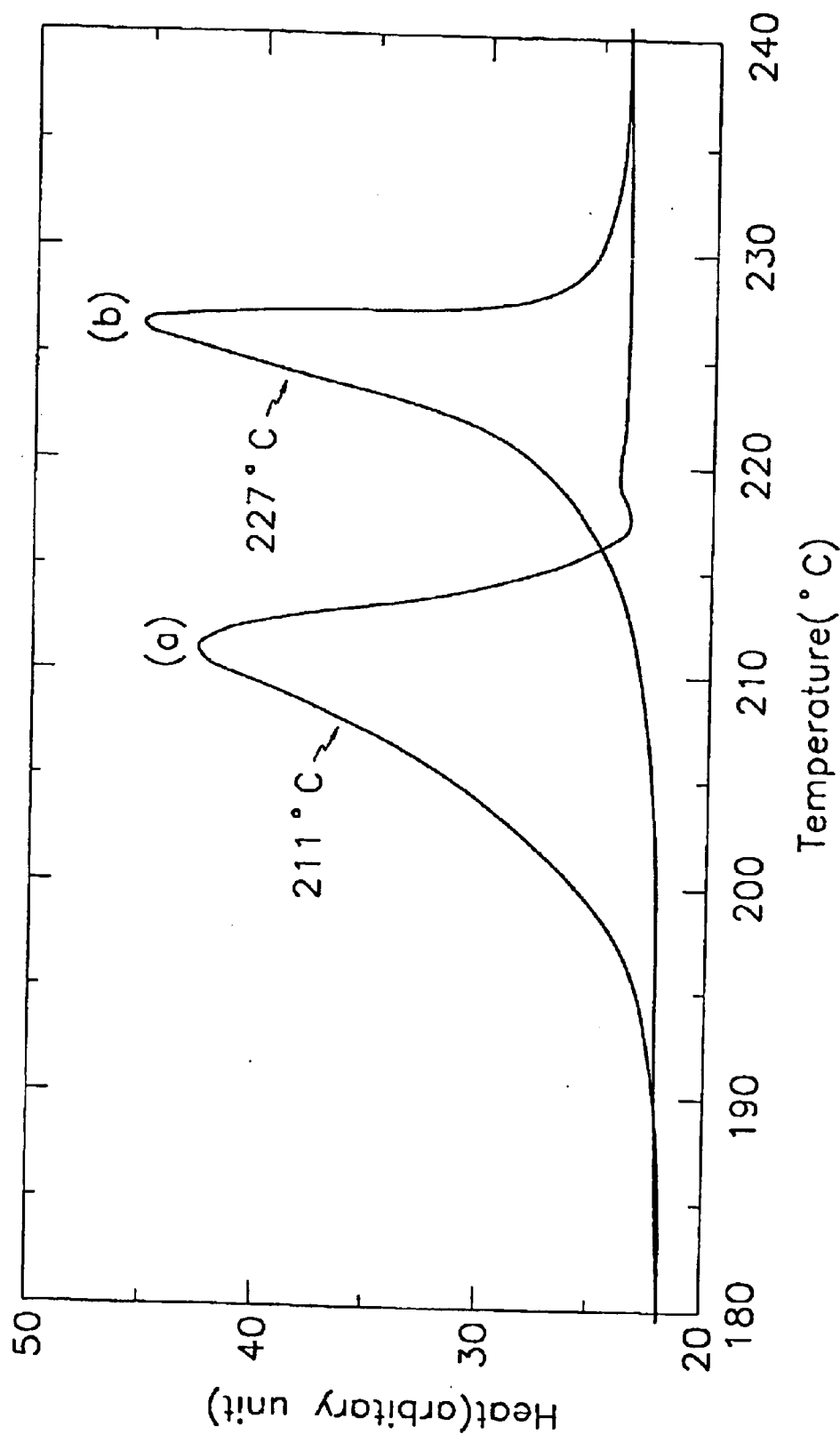
FIG. 13 is a graph illustrating DSC analysis results of positive electrodes after charging at 4.2V, prepared according to Example 10 (b) of the present invention and Comparative Example 5 (a)

Referring to FIG. 13, the curve (b) illustrates DSC analysis results of the cell of 10 after the cell was charged at 4.2V, and the curve (a) illustrates DSC analysis results of the cell of Comparative Example 5 after the cell was charged at 4.2V. As shown in FIG. 13, an exothermic peak temperature for the oxygen release is 211° C. for Comparative Example 5, while it is 227° C. for Example 10. Accordingly, 10 has about a 16° C. higher oxygen release temperature than Comparative Example 5.

Figure 14:
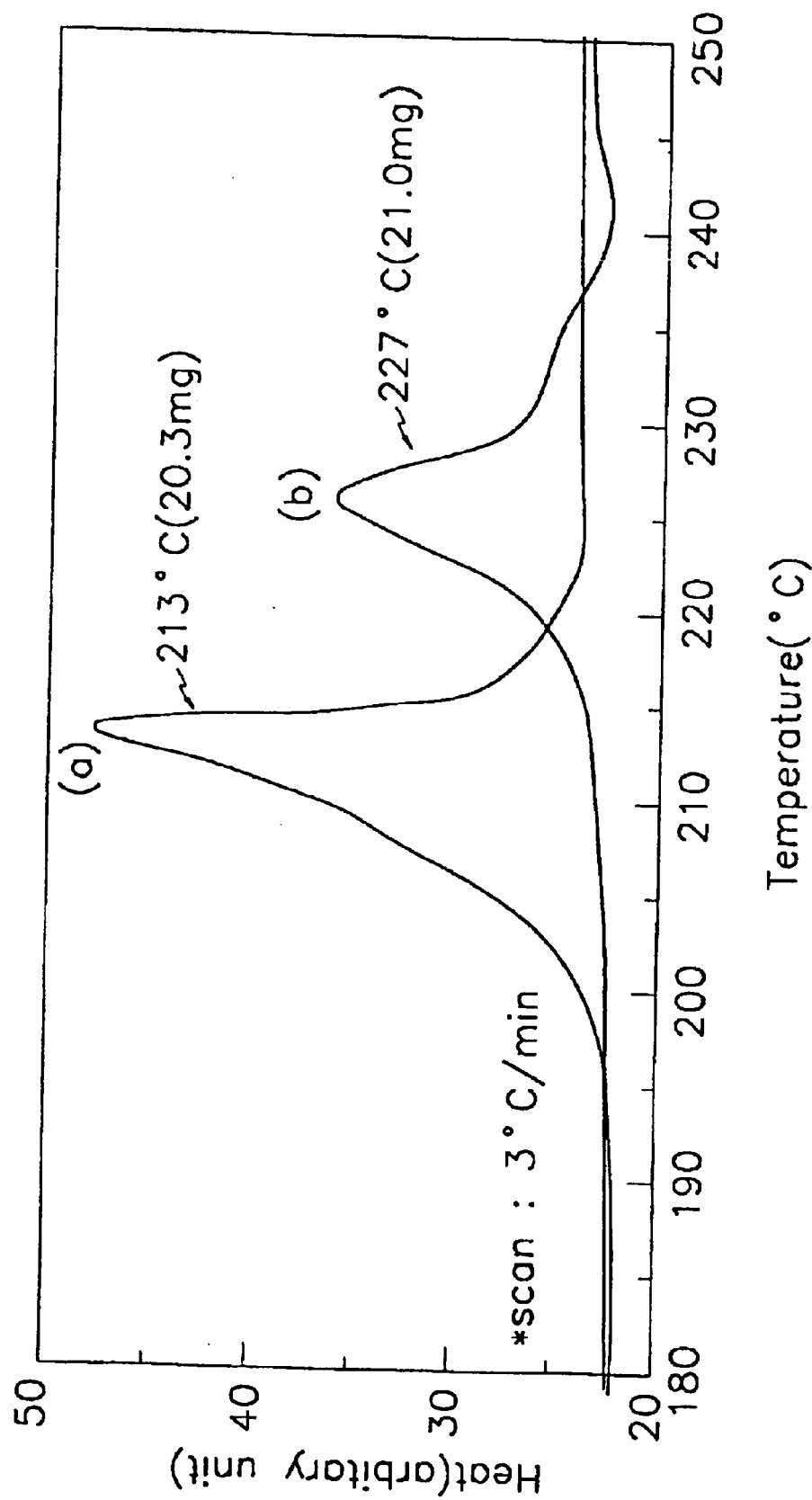
FIG. 14 is a graph illustrating DSC analysis results of positive electrodes after charging at 4.1V, prepared according to Example 10 (b) of the present invention and Comparative Example 5 (a)

In FIG. 14, the curve (b) illustrates DSC analysis results of the cell of Example 10 after the cell was charged at 4.1V, and the curve (a) illustrates DSC analysis results of the cell of Comparative Example 5 after the cell was charged at 4.1V. As shown in FIG. 14, an exothermic peak temperature for the oxygen release is 213° C. for Comparative Example 5, while it is 227° C. for Example 10. Accordingly, 10 has about a 15° C. higher oxygen decomposition temperature than Comparative Example 5, and the amount exothermic heat for 10 is about half that of Comparative Example 5.

Figure 15:
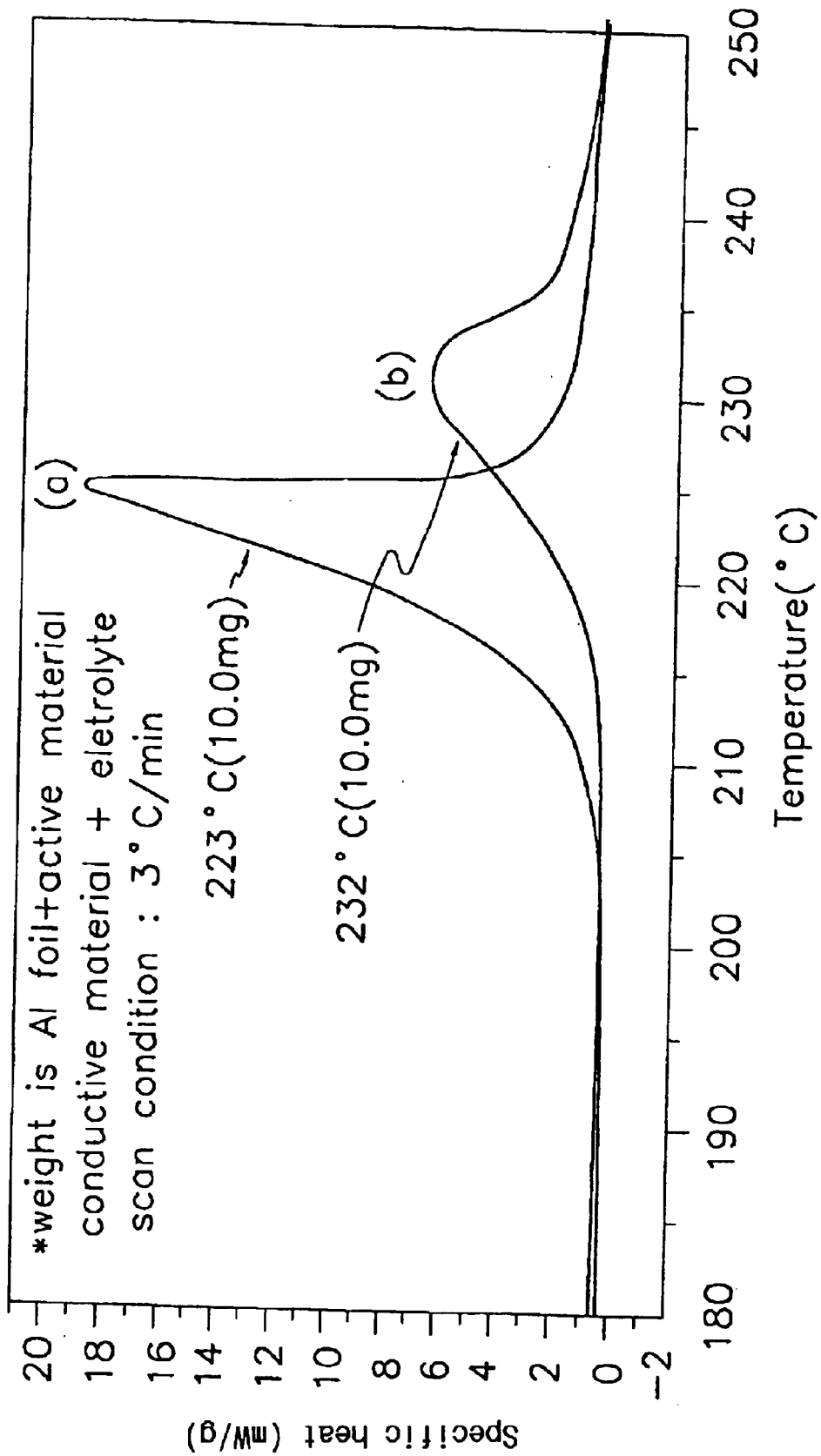
FIG. 15 is a graph illustrating DSC analysis results of positive electrodes after charging at 4.1V, prepared according to Example 11(b) of the present invention and Comparative Example 6 (a)

Referring to FIG. 15, (b) illustrates DSC analysis results of the cell of 11 after the cell was charged at 4.1V, and (a) illustrates DSC analysis results of the cell of Comparative Example 6 after the cell was charged at 4.1V. As shown in FIG. 15, the cell according to Comparative Example 6 emits heat of about 20 mW at 223° C., while the cell according to Example 11 emits heat of about 6 mW at 232° C. Accordingly, Example 11 has about a 9° C. higher oxygen decomposition peak temperature than Comparative Example 6, and the amount of exothermic heat for Example 11 is about one-third that of Comparative Example 6.

Figure 16:
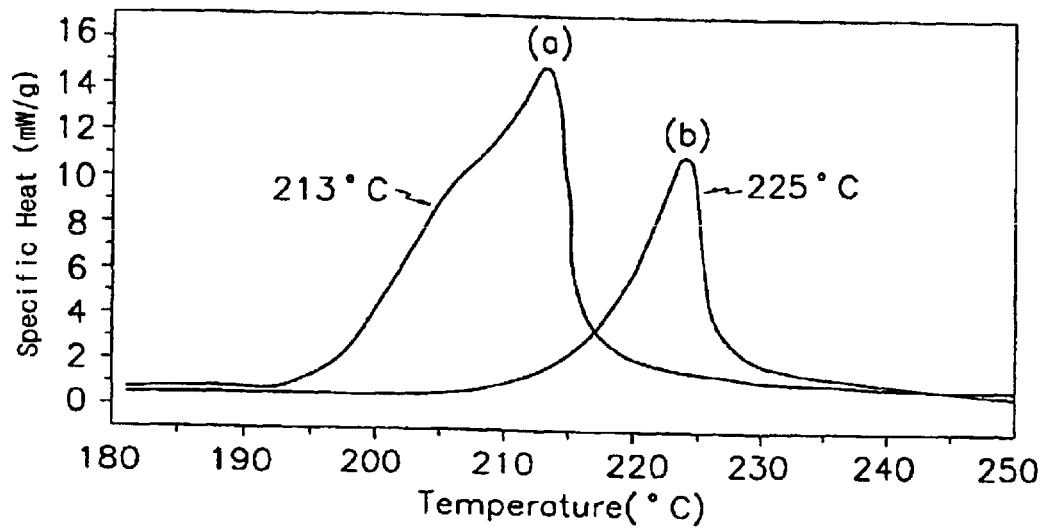
FIG. 16 is a graph illustrating DSC analysis results of positive electrodes after charging at 4.3V, prepared according to Example 12 (b) of the present invention and Comparative Example 7 (a)

Referring to FIG. 16, (b) illustrates DSC analysis results of the cell of Example 12 after the cell was charged at 4.3V, and (a) illustrates DSC analysis results of the cell of Comparative Example 7 after the cell was charged at 4.3V. As shown in FIG. 16, the cell of Comparative Example 7 emits exothermic heat of about 15 mW at 213° C., and the cell of Example 12 emits heat of about 10 mW at 225° C. Accordingly, Example 12 has about a 12° C. higher oxygen decomposition peak temperature than Comparative Example 7.

Figure 17:
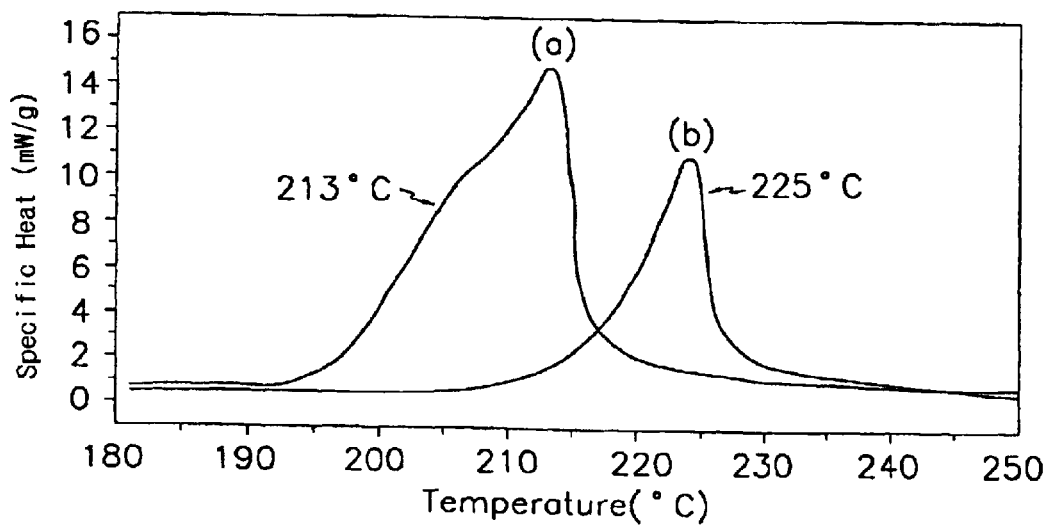
FIG. 17 is a graph illustrating DSC analysis results of positive electrodes after charging at 4.3V, prepared according to Example 13 (b) of the present invention and Comparative Example 8 (a)

Referring to FIG. 17, (b) illustrates DSC analysis results of the cell of Example 13 after the cell was charged at 4.3V, and (a) illustrates DSC analysis results of the cell of Comparative Example 8 after the cell was charged at 4.3V. As shown in FIG. 17, the cell according to Comparative Example 8 emits exothermic heat of about 10 mW at 217° C., and the cell according to Example 13 emits heat of about 2 mW at 227° C. Accordingly, Example 13 has about a 10° C. higher oxygen decomposition peak temperature than Comparative Example 8, and the amount of exothermic heat of Example 13 is about one-third that of Comparative Example 8.

Figure 18:
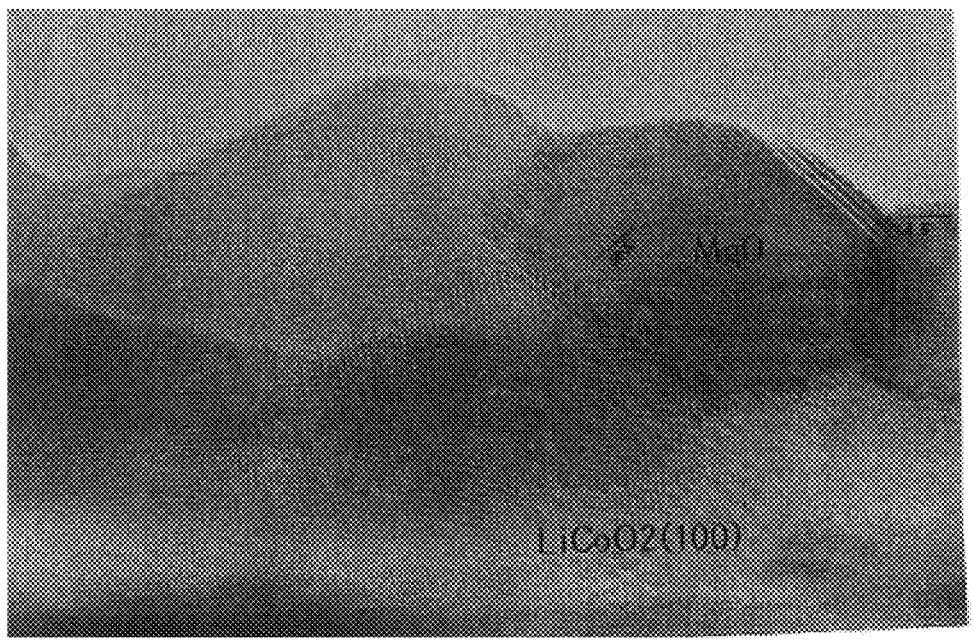
FIG. 18 is a transmission electronic microscopy (TEM) picture of a positive active material prepared according to Example 14 of the present invention.

FIG. 18 shows a TEM (transmission electron microscope) picture of active material according to Example 14. The LiCoO$_2$ active material not coated with Mg-methoxide suspension is a crystalline material having approximately a 5 $\mu$m diameter such that the surface of the material is smooth. However, in the active material of Example 14, which is coated with Mg-methoxide suspension then heat-treated, minute particles of approximately 5–15 nm surround a periphery of LiCoO$_2$, the particles of a composite of cobalt and magnesium, a metal oxide such as magnesium oxide, etc.

Figure 19:
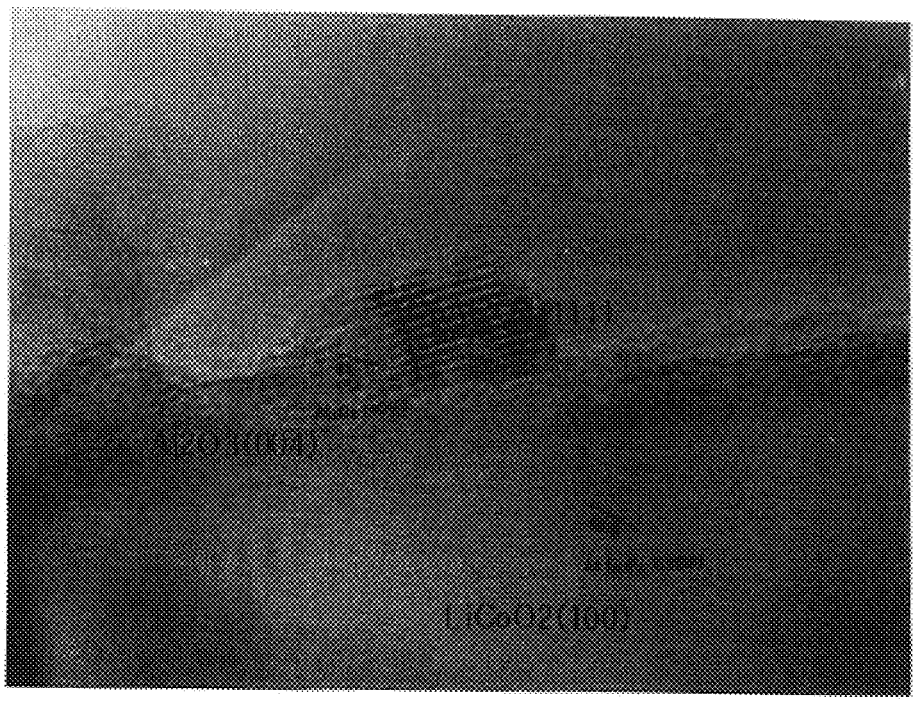
FIG. 19 is a TEM picture of a positive active material prepared according to Example 15 of the present invention.

FIG. 19 shows a TEM picture of the active material of Example 15. In Example 15, the active material is coated with Al-isopropoxide and is heat-treated. As shown in FIG. 19, a double layer structure made of a composite metal oxide of cobalt and aluminum or a metal oxide such as aluminum oxide is formed on the surface of the particles of LiCoO$_2$. Accordingly, the active material of the present invention coated with metal alkoxide suspension on its surface then heat-treated clearly has a different form compared to the material that is not processed in this manner.

Figure 20:
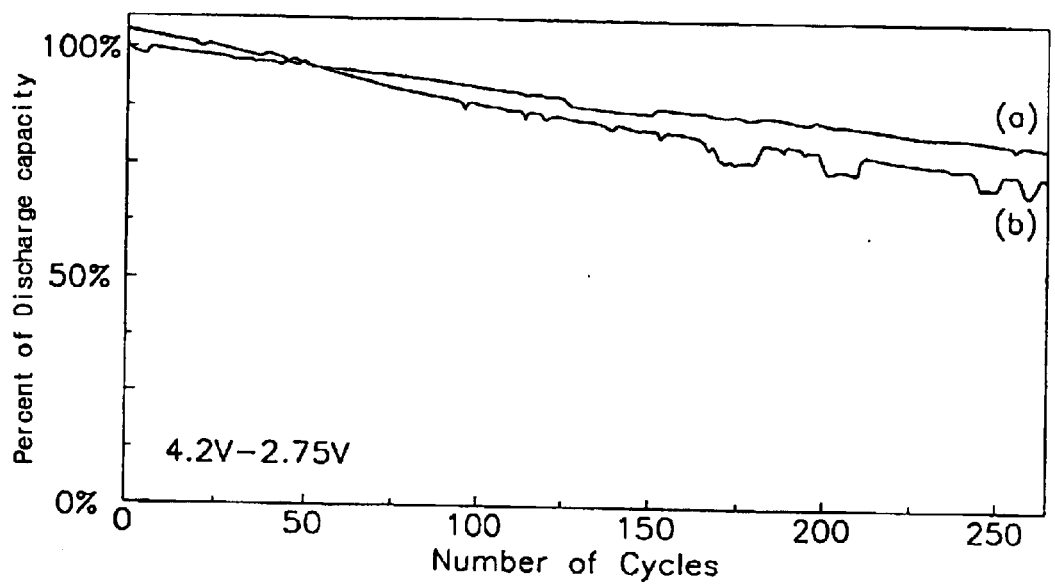
FIG. 20 is a graph illustrating a cycle life characteristics of cells prepared according to Example 16 (a) of the present invention and Comparative Example 10 (b)

FIG. 20 shows a graph of cycle-life characteristics of the cells according to Example 16 and Comparative Example 10. The cells of Example 16 and Comparative 10 had formation cycles at 0.2C rate, and then were charged-discharged at 1C rate. In FIG. 20, (a) corresponds to Example 16 and (b) corresponds to Comparative Example 10. In comparing cycle-life characteristics of the cells over 250 cycles, the capacity of Comparative Example 10 reduced by about 30% compared to its initial capacity, while the capacity of Example 16 reduced by only about 20% compared to its initial capacity. It indicates that the cycle life of Example 16 is superior to that of Comparative Example 10.

Figure 21:
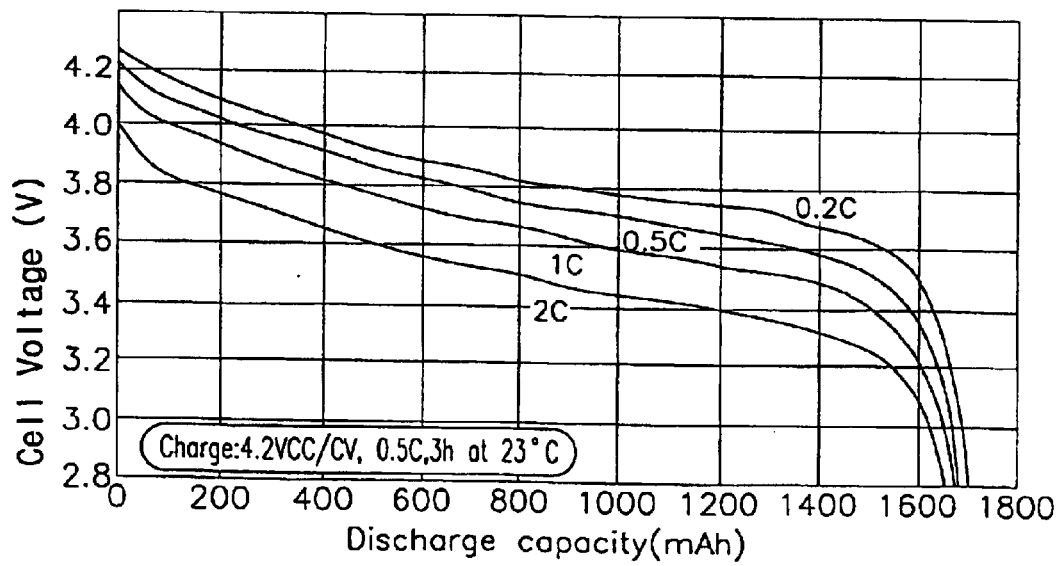
FIG. 21 is a graph illustrating charge-discharge characteristics of a cell prepared according to Example 17 of the present invention.

FIG. 21 shows a graph of discharge curves of the cell according to Example 17. After charging the cell at 0.5C rate, the discharge rate was varied from 0.2C to 0.5C, 1C, and 2C to measure cell performance at various rates. The cell showed almost full capacity even at 2C rate indicating that it has an excellent rate capability.

Figure 22:
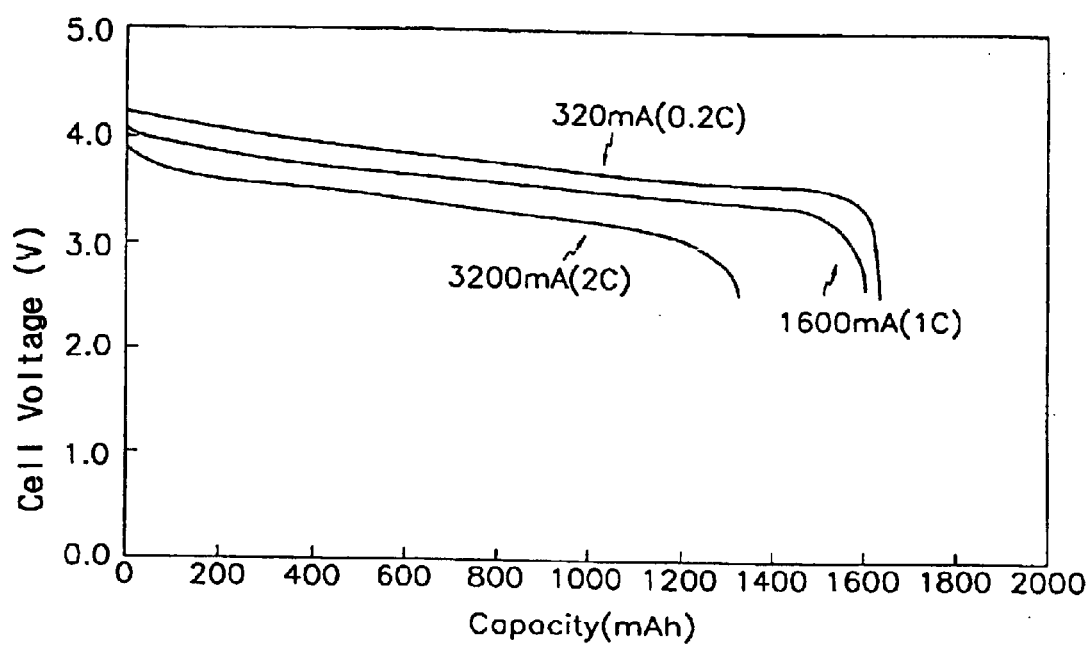
FIG. 22 is a graph illustrating charge-discharge characteristics of a cell with the positive active material prepared according to Comparative example 11.

FIG. 22 shows a graph of discharge curves of the cell according to Comparative Example 11. In comparing the discharge characteristics of Example 17 of FIG. 21 and Comparative Example 11 of FIG. 22, the characteristics are similar up to 1C rate, but at 2C rate, the amount of reduction in capacity for Example 17 is significantly smaller than Comparative Example 11.

Figure 23:
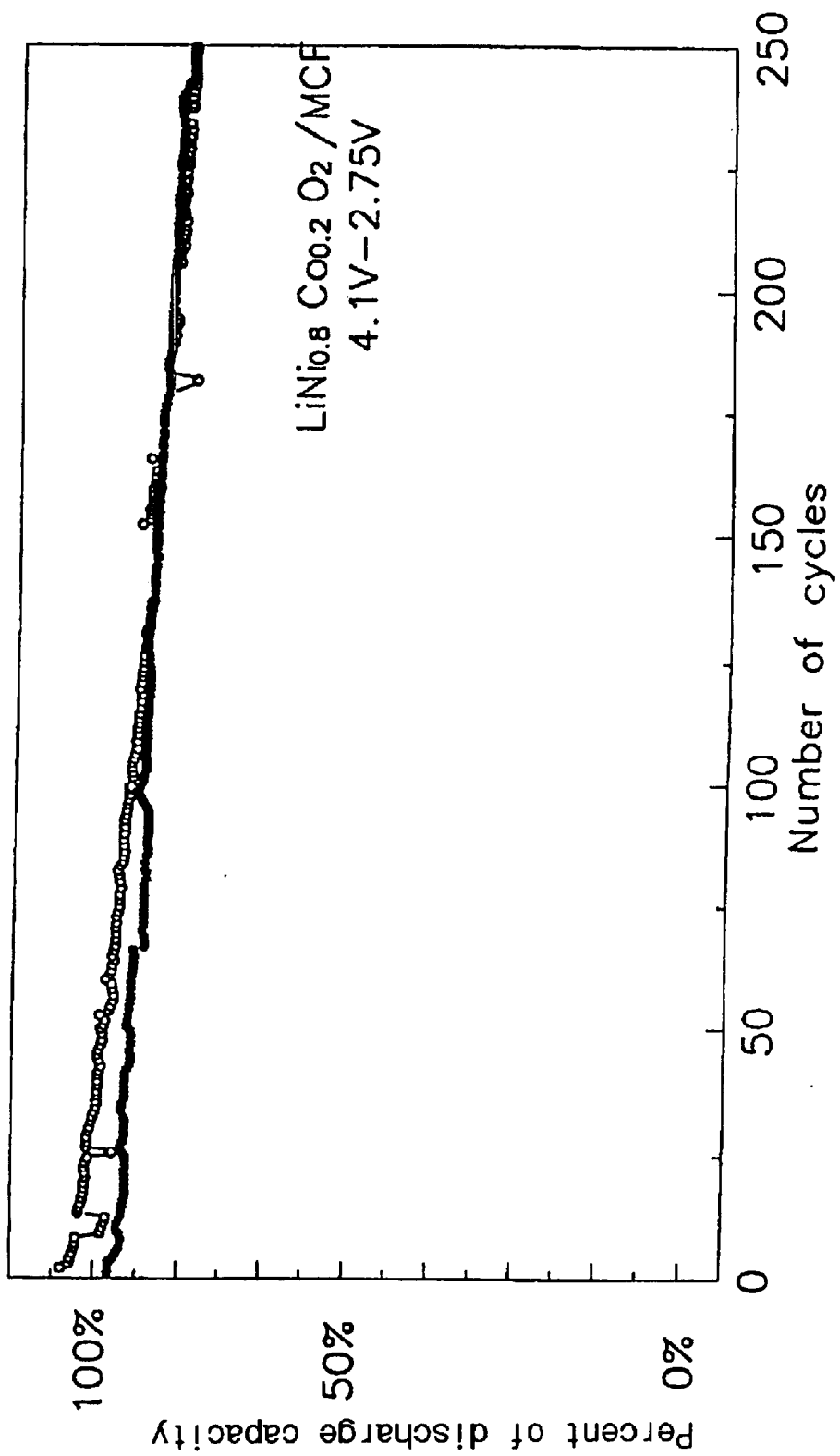
FIG. 23 is a graph illustrating cycle life characteristics of cells prepared according to Example 18 (open circles) of the present invention and Comparative Example 12 (filled circles)

FIG. 23 shows a graph of cycle-life characteristics of the cells according to Example 18 (open circles in the drawing) and Comparative Example 12 (filled circles in the drawing). As shown in FIG. 23, cycle-life characteristics for Example 18 are better than those of Comparative Example 12 up to about 100 cycles, after which the characteristics are substantially similar.

Figure 24:
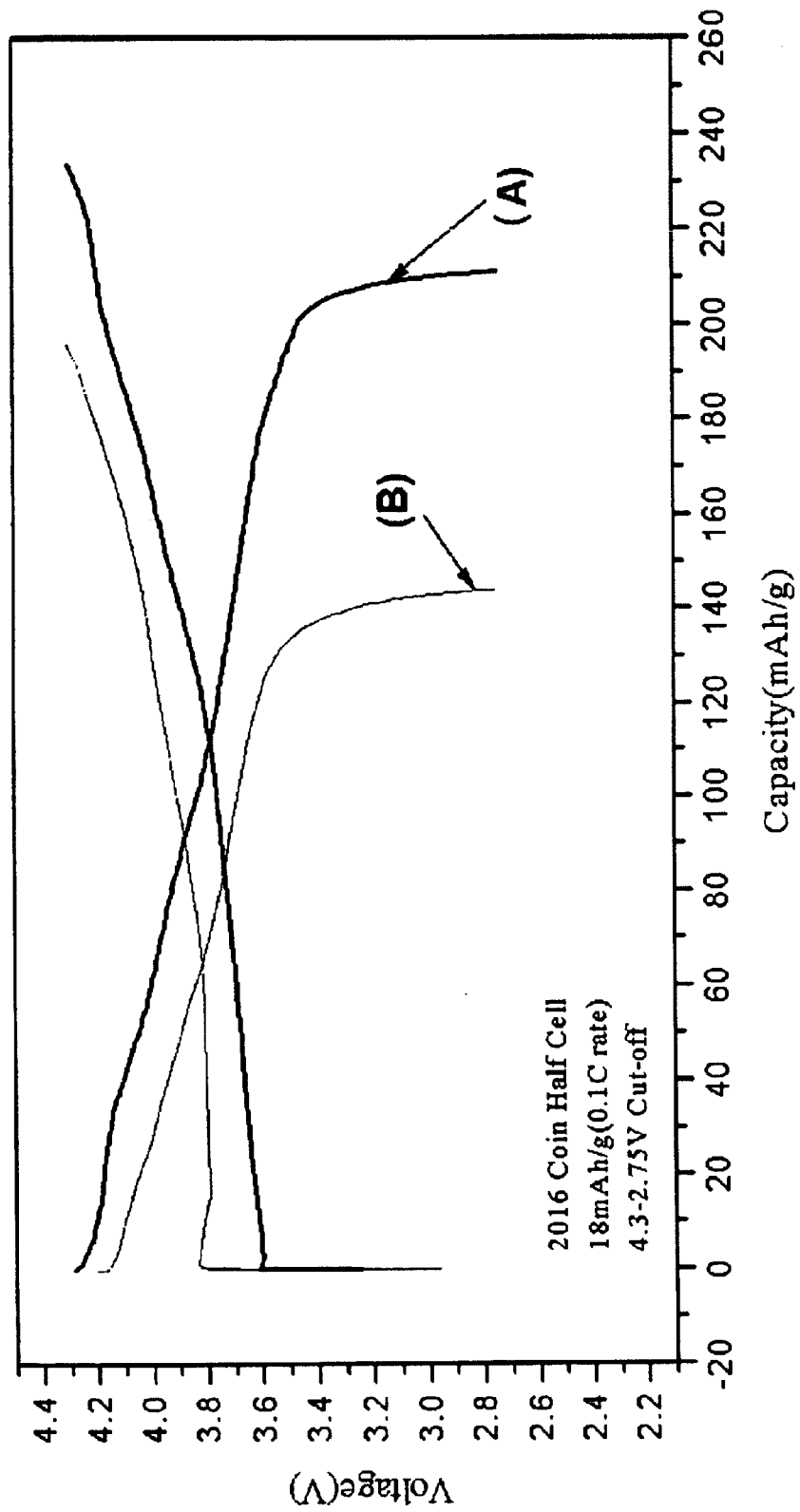
FIG. 24 is a graph illustrating the charge and discharge characteristics of the positive active materials according to Example 19 (B) of the present invention and Comparative example 13 (A)

The charge and discharge characteristics of the positive active materials according to Example 19 and Comparative example 13 are presented respectively by lines (B) and (A) of FIG. 24. It was evident from FIG. 24, the $Al_2O_3$ coatings cause to deteriorate capacity and voltage in the Ni-based active material. The result is believed that Al reacts with the Ni-based active material at the surface of the particle and its structure is modified, thereby deteriorating capacity and voltage. These results indicate that a Ni-based positive active material obtained from Japanese Patent Laid-Open Hei. 9-55210 exhibits low capacity and voltage than a Co-based positive active material of the present invention.

Figure 25:
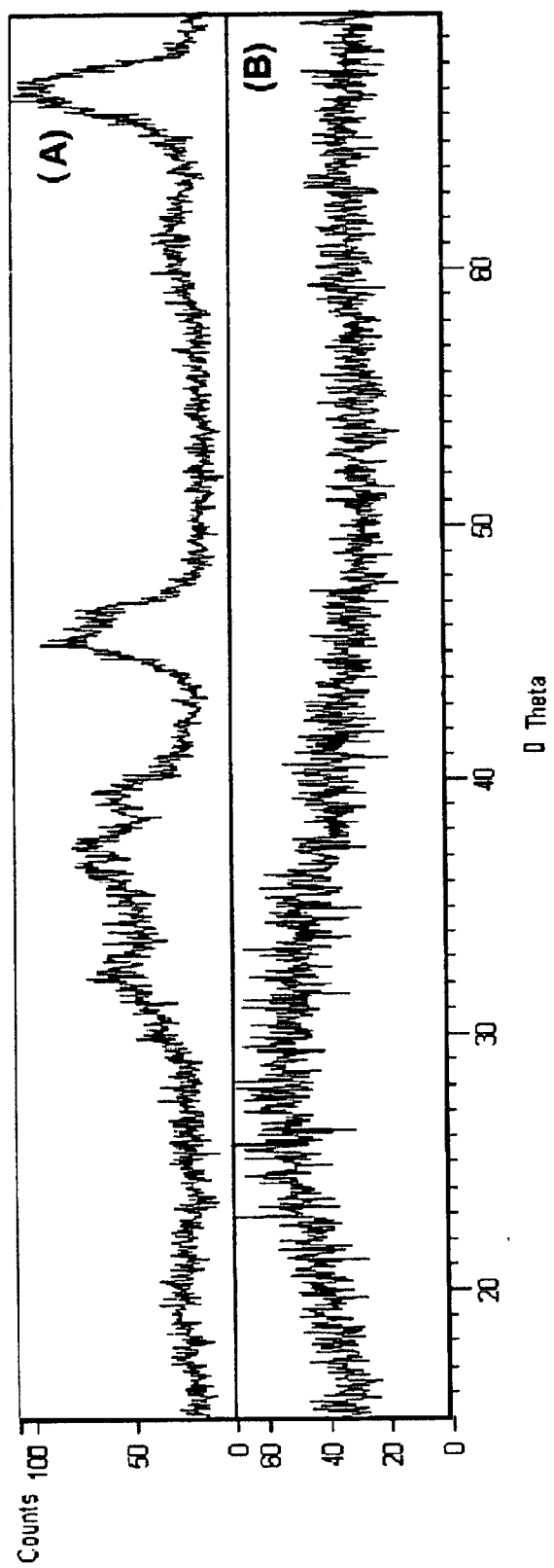
FIG. 25 is a graph illustrating XRD results of a synthesized $Al_2O_3$ (B) and a commercial $Al_2O_3$ (A)

To compare the structure of the synthesized $Al_2O_3$ of the present invention and the commercial $Al_2O_3$ of Comparative example 15, the XRD was measured. The active $Al_2O_3$ was prepared by suspending Al-isopropoxide powder in ethanol for 10 hours, drying the resulting suspension at 100° C. for 24 hours to obtain a white powder and heat-treating the white powder at 600° C. for 10 hours. The resulting $Al_2O_3$ has amorphous and active properties which are different from the commercial $Al_2O_3$ having crystalline and inactive properties. Such a difference is evidently shown in FIG. 25. The line (A) which indicates the XRD result of the inactive $Al_2O_3$ in FIG. 25 teaches that it is crystalline and the line (B) which indicates the XRD result of the active $Al_2O_3$ in FIG. 25 teaches that it is amorphous.

Figure 26:
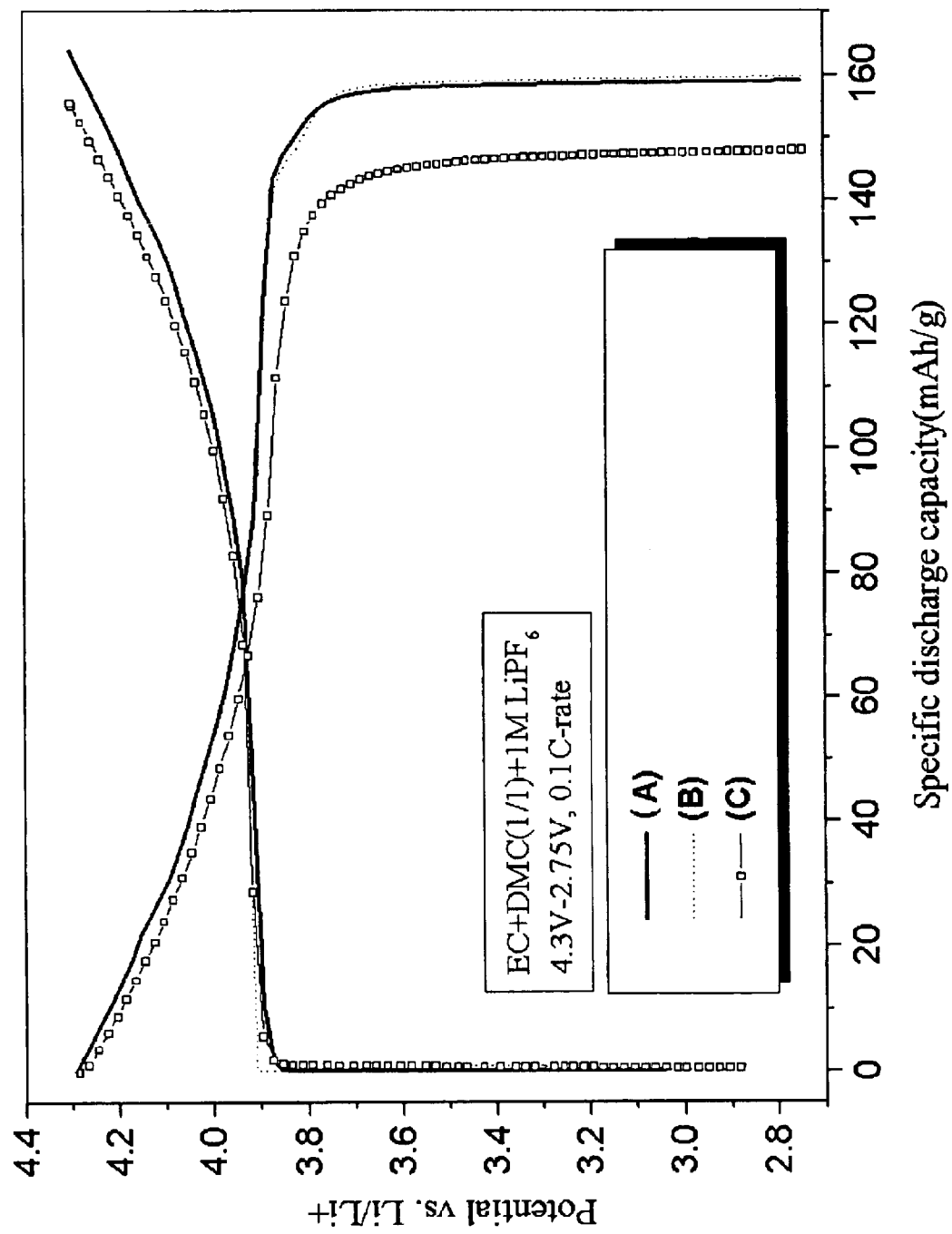
FIG. 26 is a graph illustrating the charge and discharge characteristics of the coin-type half-cells containing $LiCoO_2$ (A) and $LiCoO_2$ coated with $Al_2O_3$ (B) and $LiCoO_2$ coated with a commercial $Al_2O_3$ (C)

Each of the active $Al_2O_3$ and inactive $Al_2O_3$ was added, respectively, to the mixture of the $LiCoO_2$ positive active material, a polyvinylidene fluoride binder, and a carbon conductive agent to prepare positive active material slurries. Using the prepared positive active material slurries, coin-type half-cells were fabricated. The charge and discharge characteristics of the coin-type half-cells were measured and the results are shown in FIG. 26. For reference, the charge and discharge characteristic of the coin-type half-cells containing only $LiCoO_2$ (A) was shown in FIG. 26. As shown in FIG. 26, the coin-type half-cell containing the active $Al_2O_3$ and $LiCoO_2$ (B) (gives higher capacity (about 159 mAh/g) than that containing the inactive $Al_2O_3$ (C) and $LiCoO_2$. These results indicate that the commercial inactive $Al_2O_3$ does not improve the cell performance. It is assumed that the positive active material with the commercial $Al_2O_3$ according to Comparative example 15 (prepared by the procedure in U.S. Pat. No. 5,705,291) does not improve cell performance.

Figure 27:
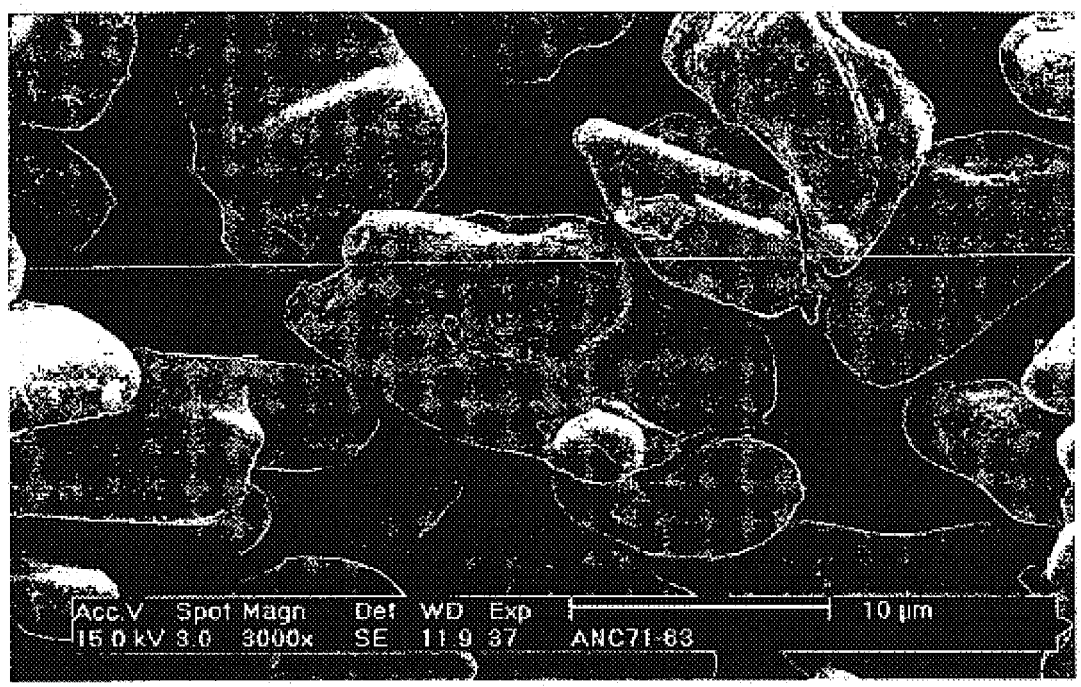
FIG. 27 is a SEM picture of a positive active material according to Example 21 of the present invention.
Figure 28:
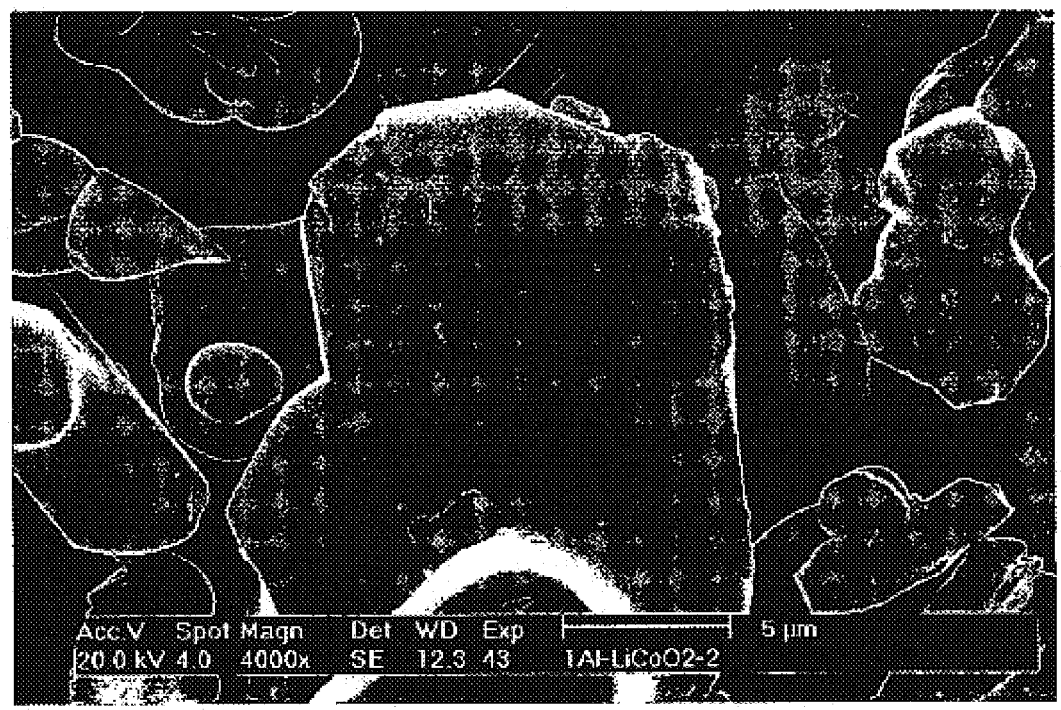
FIG. 28 is a SEM picture of a positive active material according to Comparative example 15.

The SEM pictures of the positive active materials according to Example 21 and Comparative example 15 are shown in FIGS. 27 and 28, respectively. As shown in FIG. 28, Al is partially doped into $LiCoO_2$ in Comparative example 15. In contrast, Al is coated on the $LiCoO_2$ in Example 15. This difference is believed that the Al-isopropoxide solution is used in Example 15 and $Al_2O_3$ powder is used in Comparative example 15.

Figure 29:
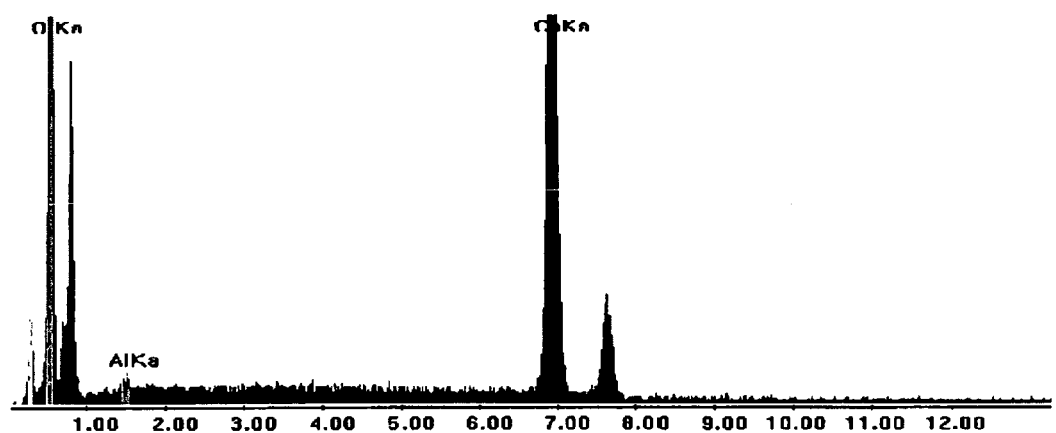
FIG. 29 is a graph illustrating an EDX result of a positive active material according to Example 21 of the present invention.
Figure 30:
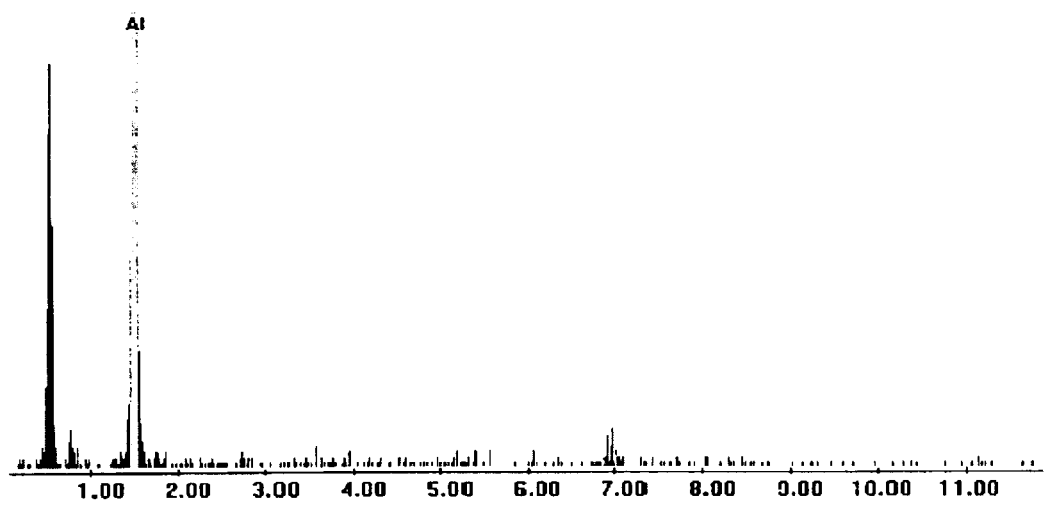
FIG. 30 is a graph illustrating an EDX result of a positive active material according to Comparative example 15.

In order to identify the structure of the positive active materials precisely according to Example 21 and Comparative example 15, an EDX analysis was carried out. The results are presented in FIGS. 29 and 30, respectively. It is shown from FIGS. 29 and 30 that the structure of the positive active material according to Example 21 is different from that according to Comparative example 15.

Although the present invention has been described in detail hereinabove, it should be clearly understood that many variations and/or modifications of the basic inventive concepts taught herein, which may appear to those skilled in the present art, will still fall within the spirit and scope of the present invention, as defined in the appended claims.

What is claimed is:

1. A positive active material for a rechargeable lithium battery comprising:
   a core comprising at least one compound represented by Formula 1; and
   an active metal oxide shell formed on the core, the metal oxide being capable of stabilizing a structure of the active material wherein the metal of the metal oxide shell is a metal selected from the group consisting of at least one of Mg, Al, Co, K, Na, Ca, Mn, Ni, B, Sr, Ba, Ti, V, Cr, Fe, and Cu;

Formula 1
   $LiA_{1-x-y}B_xC_yO_2$,
   where $0 \leq x \leq 0.3$, $0 \leq y \leq 0.01$;

A is an element selected from the group consisting of Co and Mn;

B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

2. The active material of claim 1 wherein the metal oxide is an element selected from the group consisting of Mg, Al, Co, K, Na and Ca.

3. The active material of claim 1 wherein the positive electrode active material is formed by minute particles in an agglomerated state such that a particle size of the active material is between 0.1 and 100 μm.

4. The active material of claim 1 wherein the positive electrode active material is LiNi1-XCOX02, where $0 < x \leq 0.3$.

5. The active material of claim 1 wherein the active material comprises at least one of the A, B and C metals, and a Mg composite metal oxide, and a surface of the active material is processed with minute particles of 5–15 nm in size.

6. The active material of claim 1 wherein the active material comprises at least one of the A, B and C metals, and a double layer structure of a Al composite metal oxide processed on a surface of the active material.

7. A rechargeable lithium battery comprising a positive active material, the positive active material comprising a core comprising at least one compound represented by Formula 1 and an active metal oxide shell formed on the core, the active metal oxide being capable of stabilizing a structure of the active material, wherein the metal of the metal oxide shell is a metal selected from the group consisting of at least one of Mg, Al, Co, K, Na, Ca, Mn, Ni, B, Sr, Ba, Ti, V, Cr, Fe, and Cu;

Formula 1
   $LiA_{1-x-y}B_xC_yO_2$,
   where $0 \leq x \leq 0.3$, $0 \leq y \leq 0.01$;

A is an element selected from the group consisting of Co and Mn;

B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

8. A positive active material for a rechargeable lithium battery comprising:

a core comprising $LiCoO_2$; and an active metal oxide shell formed on the core, wherein the metal of the metal oxide shell is a metal selected from the group consisting of at least one of Mg, Al, Co, K, Na, Ca, Mn, Ni, B, Sr, Ba, Ti, V, Cr, Fe, and Cu.

9. The positive active material of claim 8 wherein a metal in the active metal oxide shell is an element selected from the group consisting of Mg, Al, Co, K, Na and Ca.

10. The positive active material of claim 9 wherein the metal in the active metal oxide shell is Al.

11. The positive active material of claim 8 wherein the active metal oxide shell is processed with minute particles of 5–15 nm in size.

12. A positive active material for a rechargeable lithium battery prepared by producing a crystalline powder or a semi-crystalline powder of Formula 1;

coating the crystalline powder or the semi-crystalline powder with a metal alkoxide suspension; and heat-treating the coated powder, the positive active material comprising a core and an active metal oxide shell formed on the core, the metal oxide being capable of stabilizing the structure of the active material, wherein the metal of the metal oxide shell is a metal selected from the group consisting of at least one of Mg, Al, Co, K, Na, Ca, Mn, Ni, B, Sr, Ba, Ti, V, Cr, Fe, and Cu;

Formula 1

$LiA_{1-x-y}B_xC_yO_2$, where $0 \leq x \leq 0.3$, $0 \leq y \leq 0.01$;

A is an element selected from the group consisting of Co and Mn;

B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

13. The positive active material of claim 12 wherein a metal in the active metal oxide shell is an element selected from the group consisting of Mg, Al, Co, K, Na and Ca.

14. The positive active material of claim 13 wherein the metal in the active metal oxide shell is Al.

15. The positive active material of claim 12 wherein the active metal oxide has an amorphous phase.

16. The positive active material of claim 12 wherein the positive active material is formed of minute particles in an agglomerated state such that a particle size of the active material is between 0.1 and 100 µm.

17. The positive active material of claim 12 wherein the active metal oxide shell is processed with minute particles of 5–15 nm in size.

18. A positive active material for a rechargeable lithium battery comprising:

a core comprising $LiCoO_2$; and an active $Al_2O_3$ shell formed on the core wherein the metal of the active $Al_2O_3$ shell is metal selected from the group consisting of at least one of Mg, Al, Co, K, Na, Ca, Mn, Ni, B, Sr, Ba, Ti, V, Cr, Fe, and Cu.

* * * * *